(12) United States Patent
Ericksen et al.

(10) Patent No.: US 11,796,028 B2
(45) Date of Patent: Oct. 24, 2023

(54) METHODS AND APPARATUS FOR POSITION SENSITIVE SUSPENSION DAMPING

(71) Applicant: Fox Factory, Inc., Duluth, GA (US)

(72) Inventors: Everet Owen Ericksen, Woodland, CA (US); Christopher Paul Cox, Capitola, CA (US); Sante M. Pelot, Freedom, CA (US)

(73) Assignee: Fox Factory, Inc., Duluth, GA (US)

( * ) Notice: Subject to any disclaimer, the term of this patent is extended or adjusted under 35 U.S.C. 154(b) by 0 days.

(21) Appl. No.: 16/893,256

(22) Filed: Jun. 4, 2020

(65) Prior Publication Data

US 2020/0300330 A1    Sep. 24, 2020

Related U.S. Application Data

(60) Continuation of application No. 14/506,420, filed on Oct. 3, 2014, now Pat. No. 10,677,309, which is a
(Continued)

(51) Int. Cl.
*F16F 9/48* (2006.01)
*F16F 9/46* (2006.01)
(Continued)

(52) U.S. Cl.
CPC .............. *F16F 9/486* (2013.01); *B62K 25/06* (2013.01); *F16F 9/3405* (2013.01); *F16F 9/46* (2013.01)

(58) Field of Classification Search
CPC ........ F16F 9/06; F16F 9/48; F16F 9/49; F16F 9/63; F16F 9/342; F16F 9/064;
(Continued)

(56) References Cited

U.S. PATENT DOCUMENTS

| 435,995 A | 9/1890 | Dunlop |
| 1,078,060 A | 11/1913 | Newman |

(Continued)

FOREIGN PATENT DOCUMENTS

| CN | 101468587 A | 7/2009 |
| DE | 3241901 A1 | 5/1984 |

(Continued)

OTHER PUBLICATIONS

Electronic Translation of DE3709447A1.
(Continued)

*Primary Examiner* — Nicholas J Lane
*Assistant Examiner* — Stephen M Bowes

(57) ABSTRACT

An apparatus and system are disclosed that provide position sensitive suspension damping. A damping unit includes a piston mounted in a fluid-filled cylinder. A vented path in the piston may be fluidly coupled to a bore formed in one end of the piston rod, creating a flow path for fluid to flow from a first side of the piston to a second side of the piston during a compression stroke. The flow path may be blocked by a needle configured to engage the bore as the damping unit is substantially fully compressed, thereby causing the damping rate of the damping unit to increase. In one embodiment, the piston includes multiple bypass flow paths operable during the compression stroke or the rebound stroke of the damping unit. One or more of the bypass flow paths may be restricted by one or more shims mounted on the piston.

4 Claims, 9 Drawing Sheets

Related U.S. Application Data division of application No. 13/485,401, filed on May 31, 2012, now abandoned.

(60) Provisional application No. 61/491,858, filed on May 31, 2011.

(51) Int. Cl.
*B62K 25/06* (2006.01)
*F16F 9/34* (2006.01)

(58) Field of Classification Search
CPC .. F16F 9/065; F16F 9/067; F16F 9/486; F16F 9/348; F16F 9/512; F16F 9/3405; F16F 9/46; B64C 25/22; B64C 25/60; B64C 2025/008; B64F 2700/6242; B62K 25/06
USPC ............... 188/284, 286–289, 315, 316, 317, 188/322.13–322.16
See application file for complete search history.

(56) References Cited

U.S. PATENT DOCUMENTS

| | | |
|---|---|---|
| 1,307,502 A | 6/1919 | Martin |
| 1,313,763 A | 8/1919 | Thomas |
| 1,409,849 A | 3/1922 | Haeberlein |
| 1,468,652 A | 9/1923 | Storey et al. |
| 1,492,731 A | 5/1924 | Kerr |
| 1,560,477 A | 11/1925 | Kessler |
| 1,571,788 A | 2/1926 | Bramlette, Jr. |
| 1,575,973 A | 3/1926 | Coleman |
| 1,655,786 A | 1/1928 | Guerritore et al. |
| 1,923,011 A | 8/1933 | Moulton |
| 1,948,600 A | 2/1934 | Templeton |
| 2,018,312 A | 10/1935 | Moulton |
| 2,098,119 A | 11/1937 | White |
| 2,115,072 A | 4/1938 | Hunt et al. |
| 2,186,266 A | 1/1940 | Henry |
| 2,259,437 A | 10/1941 | Dean |
| 2,354,340 A | 7/1944 | Utter |
| 2,363,867 A | 11/1944 | Isely |
| 2,492,331 A | 12/1949 | Spring |
| 2,518,553 A | 8/1950 | Kieber |
| 2,540,525 A | 2/1951 | Howarth et al. |
| 2,559,633 A | 7/1951 | Maurice et al. |
| 2,588,520 A | 3/1952 | Halgren et al. |
| 2,697,600 A | 12/1954 | Gregoire |
| 2,705,119 A | 3/1955 | Ingwer |
| 2,725,076 A | 11/1955 | Hansen et al. |
| 2,729,308 A | 1/1956 | Koski et al. |
| 2,784,962 A | 3/1957 | Sherburne |
| 2,809,722 A | 10/1957 | Smith |
| 2,838,140 A | 6/1958 | Rasmusson et al. |
| 2,846,028 A | 8/1958 | Gunther |
| 2,853,974 A | 9/1958 | Hewitt |
| 2,879,971 A | 3/1959 | Demay |
| 2,883,181 A | 4/1959 | Hogan et al. |
| 2,897,613 A | 8/1959 | Davidson et al. |
| 2,924,304 A | 2/1960 | Patriquin |
| 2,941,629 A | 6/1960 | Etienne et al. |
| 2,967,065 A | 1/1961 | Schwendner |
| 2,973,744 A | 3/1961 | Hennells |
| 2,991,804 A | 7/1961 | Merkle |
| 3,003,595 A | 10/1961 | Patriquin et al. |
| 3,056,598 A | 10/1962 | Sutton et al. |
| 3,071,394 A | 1/1963 | John |
| 3,073,586 A | 1/1963 | Hartel et al. |
| 3,074,709 A | 1/1963 | Ellis et al. |
| 3,085,530 A | 4/1963 | Williamson |
| 3,087,583 A | 4/1963 | Bruns |
| 3,107,753 A | 10/1963 | Georgette et al. |
| 3,127,958 A | 4/1964 | Szostak |
| 3,175,645 A | 3/1965 | Schafer et al. |
| 3,202,413 A | 8/1965 | Colmerauer |
| 3,206,153 A | 9/1965 | Burke |
| 3,207,270 A | 9/1965 | Ellis |
| 3,216,535 A | 11/1965 | Schultze |
| 3,238,850 A | 3/1966 | Desmarchelier |
| 3,284,076 A | 11/1966 | Gibson |
| 3,286,797 A | 11/1966 | Leibfritz et al. |
| 3,405,625 A | 10/1968 | Carlson et al. |
| 3,419,849 A | 12/1968 | Anderson et al. |
| 3,420,493 A | 1/1969 | Kraft et al. |
| 3,447,644 A | 6/1969 | Duckett |
| 3,494,606 A | 2/1970 | Hanchen |
| 3,528,700 A | 9/1970 | Janu et al. |
| 3,537,722 A | 11/1970 | Moulton |
| 3,556,137 A | 1/1971 | Billeter et al. |
| 3,559,027 A | 1/1971 | Arsem |
| 3,560,033 A | 2/1971 | Barkus |
| 3,575,442 A | 4/1971 | Elliott et al. |
| 3,584,331 A | 6/1971 | Richard et al. |
| 3,603,575 A | 9/1971 | Arlasky et al. |
| 3,605,960 A | 9/1971 | Singer |
| 3,621,950 A | 11/1971 | Lutz |
| 3,650,033 A | 3/1972 | Behne et al. |
| 3,701,544 A | 10/1972 | Stankovich |
| 3,714,953 A | 2/1973 | Solvang |
| 3,750,856 A | 8/1973 | Kenworthy et al. |
| 3,784,228 A | 1/1974 | Hoffmann et al. |
| 3,791,408 A | 2/1974 | Saitou et al. |
| 3,792,644 A | 2/1974 | Ferguson et al. |
| 3,795,291 A | 3/1974 | Naito et al. |
| 3,830,482 A | 8/1974 | Norris |
| 3,842,753 A | 10/1974 | Ross et al. |
| 3,861,487 A | 1/1975 | Gill |
| 3,903,613 A | 9/1975 | Bisberg |
| 3,941,402 A | 3/1976 | Yankowski et al. |
| 3,981,204 A | 9/1976 | Starbard et al. |
| 3,981,479 A | 9/1976 | Foster et al. |
| 3,986,118 A | 10/1976 | Madigan |
| 3,995,883 A | 12/1976 | Glaze |
| 4,022,113 A | 5/1977 | Blatt et al. |
| 4,032,829 A | 6/1977 | Schenavar et al. |
| 4,036,335 A | 7/1977 | Thompson et al. |
| 4,045,008 A | 8/1977 | Bauer |
| 4,072,087 A | 2/1978 | Mueller et al. |
| 4,103,881 A | 8/1978 | Simich |
| 4,121,610 A | 10/1978 | Harms et al. |
| 4,131,657 A | 12/1978 | Ball et al. |
| 4,139,186 A | 2/1979 | Postema et al. |
| 4,153,237 A | 5/1979 | Supalla |
| 4,159,106 A | 6/1979 | Nyman et al. |
| 4,166,612 A | 9/1979 | Freitag et al. |
| 4,174,098 A | 11/1979 | Baker et al. |
| 4,183,509 A | 1/1980 | Nishikawa et al. |
| 4,287,812 A | 9/1981 | Iizumi |
| 4,291,850 A | 9/1981 | Sharples |
| 4,305,566 A | 12/1981 | Grawunde |
| 4,311,302 A | 1/1982 | Heyer et al. |
| 4,333,668 A | 6/1982 | Hendrickson et al. |
| 4,334,711 A | 6/1982 | Mazur et al. |
| 4,337,850 A | 7/1982 | Shimokura et al. |
| 4,348,016 A | 9/1982 | Milly |
| 4,351,515 A | 9/1982 | Yoshida |
| 4,366,969 A | 1/1983 | Benya et al. |
| 4,387,781 A | 6/1983 | Ezell et al. |
| 4,437,548 A | 3/1984 | Ashiba et al. |
| 4,465,299 A | 8/1984 | Stone et al. |
| 4,474,363 A | 10/1984 | Numazawa et al. |
| 4,491,207 A | 1/1985 | Boonchanta et al. |
| 4,500,827 A | 2/1985 | Merritt et al. |
| 4,502,673 A | 3/1985 | Clark et al. |
| 4,529,180 A | 7/1985 | Hill |
| 4,546,959 A | 10/1985 | Tanno |
| 4,548,233 A | 10/1985 | Wolfges |
| 4,550,899 A | 11/1985 | Holley |
| 4,570,851 A | 2/1986 | Cirillo et al. |
| 4,572,317 A | 2/1986 | Isono et al. |
| 4,620,619 A | 11/1986 | Emura et al. |
| 4,624,346 A | 11/1986 | Katz et al. |
| 4,630,818 A | 12/1986 | Saarinen |
| 4,634,142 A | 1/1987 | Woods et al. |
| 4,647,068 A | 3/1987 | Asami et al. |

(56) References Cited

U.S. PATENT DOCUMENTS

| | | |
|---|---|---|
| 4,655,440 A | 4/1987 | Eckert |
| 4,657,280 A | 4/1987 | Ohmori et al. |
| 4,659,104 A | 4/1987 | Tanaka et al. |
| 4,660,689 A | 4/1987 | Hayashi et al. |
| 4,662,616 A | 5/1987 | Hennells |
| 4,673,194 A | 6/1987 | Sugasawa |
| 4,696,489 A | 9/1987 | Fujishiro et al. |
| 4,709,779 A | 12/1987 | Takehara |
| 4,729,459 A | 3/1988 | Inagaki et al. |
| 4,732,244 A | 3/1988 | Verkuylen |
| 4,743,000 A | 5/1988 | Karnopp |
| 4,744,444 A | 5/1988 | Gillingham |
| 4,750,735 A | 6/1988 | Furgerson et al. |
| 4,765,648 A | 8/1988 | Mander et al. |
| 4,773,671 A | 9/1988 | Inagaki |
| 4,786,034 A | 11/1988 | Heess et al. |
| 4,815,575 A | 3/1989 | Murty et al. |
| 4,821,852 A | 4/1989 | Yokoya |
| 4,826,207 A | 5/1989 | Yoshioka et al. |
| 4,830,395 A | 5/1989 | Foley |
| 4,836,578 A | 6/1989 | Soltis |
| 4,838,306 A | 6/1989 | Horn et al. |
| 4,838,394 A | 6/1989 | Lemme et al. |
| 4,838,527 A | 6/1989 | Holley |
| 4,846,317 A | 7/1989 | Hudgens |
| 4,858,733 A | 8/1989 | Noguchi et al. |
| 4,919,166 A | 4/1990 | Sims et al. |
| 4,936,423 A | 6/1990 | Karnopp |
| 4,936,424 A | 6/1990 | Costa |
| 4,938,228 A | 7/1990 | Righter |
| 4,949,262 A | 8/1990 | Buma et al. |
| 4,949,989 A | 8/1990 | Kakizaki et al. |
| 4,958,706 A | 9/1990 | Richardson et al. |
| 4,972,928 A | 11/1990 | Sirven |
| 4,975,849 A | 12/1990 | Ema et al. |
| 4,984,819 A | 1/1991 | Kakizaki et al. |
| 4,986,393 A | 1/1991 | Preukschat et al. |
| 5,027,303 A | 6/1991 | Witte |
| 5,031,455 A | 7/1991 | Cline |
| 5,036,934 A | 8/1991 | Nishina et al. |
| 5,040,381 A | 8/1991 | Hazen |
| 5,044,614 A | 9/1991 | Rau |
| 5,060,959 A | 10/1991 | Davis et al. |
| 5,072,812 A | 12/1991 | Imaizumi |
| 5,074,624 A | 12/1991 | Stauble et al. |
| 5,076,404 A | 12/1991 | Gustafsson |
| 5,080,392 A | 1/1992 | Bazergui |
| 5,094,325 A | 3/1992 | Smith |
| 5,105,918 A | 4/1992 | Hagiwara et al. |
| 5,113,980 A | 5/1992 | Furrer et al. |
| 5,127,634 A | 7/1992 | Le |
| 5,152,547 A | 10/1992 | Davis |
| 5,161,653 A | 11/1992 | Hare |
| 5,161,817 A | 11/1992 | Daum et al. |
| 5,163,742 A | 11/1992 | Topfer et al. |
| 5,178,242 A | 1/1993 | Nakamura et al. |
| 5,186,481 A | 2/1993 | Turner |
| 5,203,584 A | 4/1993 | Butsuen et al. |
| 5,207,774 A | 5/1993 | Wolfe et al. |
| 5,230,364 A | 7/1993 | Leng et al. |
| 5,231,583 A | 7/1993 | Lizell |
| 5,236,169 A | 8/1993 | Johnsen et al. |
| 5,246,247 A | 9/1993 | Runkel |
| 5,248,014 A | 9/1993 | Ashiba |
| 5,259,487 A | 11/1993 | Petek et al. |
| 5,263,559 A | 11/1993 | Mettner |
| 5,265,902 A | 11/1993 | Lewis |
| 5,277,283 A | 1/1994 | Yamaoka et al. |
| 5,283,733 A | 2/1994 | Colley |
| 5,284,330 A | 2/1994 | Carlson et al. |
| 5,293,971 A | 3/1994 | Kanari |
| 5,295,074 A | 3/1994 | Williams |
| 5,295,563 A | 3/1994 | Bennell |
| 5,297,045 A | 3/1994 | Williams et al. |
| 5,307,907 A | 5/1994 | Nakamura et al. |
| 5,310,203 A | 5/1994 | Chen |
| 5,318,066 A | 6/1994 | Burgorf et al. |
| 5,328,004 A | 7/1994 | Fannin et al. |
| 5,346,242 A | 9/1994 | Karnopp |
| 5,347,186 A | 9/1994 | Konotchick et al. |
| 5,348,112 A | 9/1994 | Vaillancourt |
| 5,372,223 A | 12/1994 | Dekock et al. |
| 5,372,224 A | 12/1994 | Samonil et al. |
| 5,381,952 A | 1/1995 | Duprez |
| 5,390,949 A | 2/1995 | Naganathan et al. |
| 5,392,885 A | 2/1995 | Patzenhauer et al. |
| 5,396,973 A | 3/1995 | Schwemmer et al. |
| 5,398,787 A | 3/1995 | Woessner et al. |
| 5,413,196 A | 5/1995 | Forster |
| 5,445,366 A | 8/1995 | Shih et al. |
| 5,467,280 A | 11/1995 | Kimura |
| 5,475,593 A | 12/1995 | Townend |
| 5,480,011 A | 1/1996 | Nagai et al. |
| 5,485,417 A | 1/1996 | Wolf et al. |
| 5,487,006 A | 1/1996 | Kakizaki et al. |
| 5,503,258 A | 4/1996 | Clarke et al. |
| 5,517,898 A | 5/1996 | Kim et al. |
| 5,542,150 A | 8/1996 | Tu |
| 5,551,674 A | 9/1996 | Johnsen |
| 5,553,836 A | 9/1996 | Ericson |
| 5,558,190 A | 9/1996 | Chang |
| 5,566,794 A | 10/1996 | Wiard |
| 5,578,877 A | 11/1996 | Tiemann |
| 5,588,510 A | 12/1996 | Wilke |
| 5,592,401 A | 1/1997 | Kramer |
| 5,597,180 A | 1/1997 | Ganzel et al. |
| 5,598,337 A | 1/1997 | Butsuen et al. |
| 5,601,164 A | 2/1997 | Ohsaki et al. |
| 5,611,413 A | 3/1997 | Feigel |
| 5,634,563 A | 6/1997 | Peng |
| 5,651,433 A | 7/1997 | Wirth et al. |
| 5,657,840 A | 8/1997 | Lizell |
| 5,687,575 A | 11/1997 | Keville et al. |
| 5,697,477 A | 12/1997 | Hiramoto et al. |
| 5,699,885 A | 12/1997 | Forster |
| 5,722,645 A | 3/1998 | Reitter |
| 5,803,443 A | 9/1998 | Chang |
| 5,806,159 A | 9/1998 | Ohnishi et al. |
| 5,810,128 A | 9/1998 | Eriksson et al. |
| 5,810,384 A | 9/1998 | Iwasaki et al. |
| 5,813,456 A | 9/1998 | Milner et al. |
| 5,813,731 A | 9/1998 | Newman et al. |
| 5,816,281 A | 10/1998 | Mixon |
| 5,818,132 A | 10/1998 | Konotchick et al. |
| 5,826,935 A | 10/1998 | Defreitas et al. |
| 5,828,843 A | 10/1998 | Samuel et al. |
| 5,829,733 A | 11/1998 | Becker |
| 5,833,036 A | 11/1998 | Gillespie |
| 5,850,352 A | 12/1998 | Moezzi et al. |
| 5,853,071 A | 12/1998 | Robinson |
| 5,872,418 A | 2/1999 | Wischnewskiy |
| 5,884,921 A | 3/1999 | Katsuda et al. |
| 5,937,975 A | 8/1999 | Forster |
| 5,947,238 A | 9/1999 | Jolly et al. |
| 5,952,823 A | 9/1999 | Sprecher et al. |
| 5,954,318 A | 9/1999 | Kluhsman |
| 5,956,951 A | 9/1999 | O"Callaghan |
| 5,957,252 A | 9/1999 | Berthold |
| 5,971,116 A | 10/1999 | Franklin |
| 5,987,368 A | 11/1999 | Kamimae et al. |
| 5,988,330 A | 11/1999 | Morris |
| 5,988,655 A | 11/1999 | Sakai et al. |
| 5,992,450 A | 11/1999 | Parker et al. |
| 5,996,745 A | 12/1999 | Jones et al. |
| 5,996,746 A | 12/1999 | Turner et al. |
| 5,999,868 A | 12/1999 | Beno et al. |
| 6,000,702 A | 12/1999 | Streiter |
| 6,013,007 A | 1/2000 | Root et al. |
| 6,017,047 A | 1/2000 | Hoose |
| 6,029,958 A | 2/2000 | Larsson et al. |
| 6,035,979 A | 3/2000 | Forster |
| 6,050,583 A | 4/2000 | Bohn |
| 6,058,340 A | 5/2000 | Uchiyama et al. |
| 6,067,490 A | 5/2000 | Ichimaru et al. |

(56) References Cited

U.S. PATENT DOCUMENTS

| | | |
|---|---|---|
| 6,073,536 A | 6/2000 | Campbell |
| 6,073,700 A | 6/2000 | Tsuji et al. |
| 6,073,736 A | 6/2000 | Franklin |
| 6,092,011 A | 7/2000 | Hiramoto et al. |
| 6,092,816 A | 7/2000 | Sekine et al. |
| 6,105,988 A | 8/2000 | Turner et al. |
| 6,112,868 A | 9/2000 | Graham et al. |
| 6,120,049 A | 9/2000 | Gonzalez et al. |
| 6,131,709 A | 10/2000 | Jolly et al. |
| 6,135,434 A | 10/2000 | Marking |
| 6,141,969 A | 11/2000 | Launchbury et al. |
| 6,151,930 A | 11/2000 | Carlson |
| 6,152,856 A | 11/2000 | Studor et al. |
| 6,179,098 B1 | 1/2001 | Hayakawa et al. |
| 6,196,555 B1 | 3/2001 | Gaibler |
| 6,199,669 B1 | 3/2001 | Huang et al. |
| 6,203,026 B1 | 3/2001 | Jones |
| 6,213,263 B1 | 4/2001 | De Frenne |
| 6,215,217 B1 | 4/2001 | Kurosawa et al. |
| 6,217,049 B1 | 4/2001 | Becker |
| 6,219,045 B1 | 4/2001 | Leahy et al. |
| 6,244,398 B1 | 6/2001 | Girvin et al. |
| 6,254,067 B1 | 7/2001 | Yih |
| 6,279,702 B1 | 8/2001 | Koh |
| 6,290,034 B1 | 9/2001 | Ichimaru |
| 6,293,530 B1 | 9/2001 | Delorenzis et al. |
| 6,296,092 B1 | 10/2001 | Marking et al. |
| 6,311,962 B1 | 11/2001 | Marking |
| 6,318,525 B1 | 11/2001 | Vignocchi et al. |
| 6,321,888 B1 | 11/2001 | Reybrouck et al. |
| 6,322,468 B1 | 11/2001 | Wing et al. |
| 6,336,648 B1 | 1/2002 | Bohn |
| 6,343,807 B1 | 2/2002 | Rathbun |
| 6,359,837 B1 | 3/2002 | Tsukamoto et al. |
| 6,360,857 B1 | 3/2002 | Fox et al. |
| 6,371,262 B1 | 4/2002 | Katou et al. |
| 6,371,267 B1 | 4/2002 | Kao et al. |
| 6,378,816 B1 | 4/2002 | Pfister |
| 6,378,885 B1 | 4/2002 | Ellsworth et al. |
| 6,382,370 B1 | 5/2002 | Girvin |
| 6,389,341 B1 | 5/2002 | Davis |
| 6,390,747 B1 | 5/2002 | Commins |
| 6,394,238 B1 | 5/2002 | Rogala |
| 6,401,883 B1 | 6/2002 | Nyce et al. |
| 6,412,788 B1 | 7/2002 | Ichimaru |
| 6,415,895 B2 | 7/2002 | Marking et al. |
| 6,418,360 B1 | 7/2002 | Spivey et al. |
| 6,427,812 B2 | 8/2002 | Crawley et al. |
| 6,434,460 B1 | 8/2002 | Uchino et al. |
| 6,446,771 B1 | 9/2002 | Sintorn et al. |
| 6,458,060 B1 | 10/2002 | Watterson et al. |
| 6,467,593 B1 | 10/2002 | Corradini et al. |
| 6,474,454 B2 | 11/2002 | Matsumoto et al. |
| 6,474,753 B1 | 11/2002 | Rieth et al. |
| 6,501,554 B1 | 12/2002 | Hackney et al. |
| 6,502,837 B1 | 1/2003 | Hamilton et al. |
| 6,510,929 B1 | 1/2003 | Gordan et al. |
| 6,520,297 B1 | 2/2003 | Lumpkin et al. |
| 6,527,093 B2 | 3/2003 | Oliver et al. |
| 6,592,136 B2 | 7/2003 | Becker et al. |
| 6,604,751 B2 | 8/2003 | Fox |
| 6,609,686 B2 | 8/2003 | Malizia |
| 6,619,615 B1 | 9/2003 | Mayr et al. |
| 6,623,389 B1 | 9/2003 | Campagnolo |
| 6,648,109 B2 | 11/2003 | Farr et al. |
| 6,659,240 B2 | 12/2003 | Dernebo |
| 6,659,241 B2 | 12/2003 | Sendrea |
| 6,672,687 B2 | 1/2004 | Nishio |
| 6,701,234 B1 | 3/2004 | Vogelsang et al. |
| 6,722,678 B2 | 4/2004 | McAndrews |
| 6,732,033 B2 | 5/2004 | Laplante et al. |
| 6,755,113 B2 | 6/2004 | Shih |
| 6,782,980 B2 | 8/2004 | Nakadate |
| 6,817,454 B2 | 11/2004 | Nezu et al. |
| 6,837,827 B1 | 1/2005 | Lee et al. |
| 6,840,257 B2 | 1/2005 | Dario et al. |
| 6,853,955 B1 | 2/2005 | Burrell et al. |
| 6,857,625 B2 | 2/2005 | Löser et al. |
| 6,863,291 B2 | 3/2005 | Miyoshi |
| 6,883,650 B2 | 4/2005 | Van Wonderen et al. |
| 6,902,513 B1 | 6/2005 | McClure et al. |
| 6,905,203 B2 | 6/2005 | Kremers et al. |
| 6,920,951 B2 | 7/2005 | Song et al. |
| 6,921,351 B1 | 7/2005 | Hickman et al. |
| 6,923,853 B2 | 8/2005 | Kremers et al. |
| 6,935,157 B2 | 8/2005 | Miller |
| 6,952,060 B2 | 10/2005 | Goldner et al. |
| 6,959,906 B2 | 11/2005 | Hoenig et al. |
| 6,959,921 B2 | 11/2005 | Rose |
| 6,966,412 B2 | 11/2005 | Braswell et al. |
| 6,978,871 B2 | 12/2005 | Holiviers |
| 6,978,872 B2 | 12/2005 | Turner |
| 6,991,076 B2 | 1/2006 | McAndrews |
| 7,025,367 B2 | 4/2006 | McKinnon et al. |
| 7,076,351 B2 | 7/2006 | Hamilton et al. |
| 7,128,192 B2 | 10/2006 | Fox |
| 7,128,693 B2 | 10/2006 | Brown et al. |
| 7,135,794 B2 | 11/2006 | Kuhnel |
| 7,147,207 B2 | 12/2006 | Jordan et al. |
| 7,163,222 B2 | 1/2007 | Becker et al. |
| 7,166,062 B1 | 1/2007 | Watterson et al. |
| 7,166,064 B2 | 1/2007 | Ashby et al. |
| 7,204,466 B2 | 4/2007 | Hsieh |
| 7,208,845 B2 | 4/2007 | Schaefer et al. |
| 7,217,224 B2 | 5/2007 | Thomas |
| 7,234,575 B2 | 6/2007 | Anderfaas et al. |
| 7,234,680 B2 | 6/2007 | Hull et al. |
| 7,243,763 B2 | 7/2007 | Carlson |
| 7,255,210 B2 | 8/2007 | Larsson et al. |
| 7,270,221 B2 | 9/2007 | McAndrews |
| 7,270,222 B1 | 9/2007 | Aymar et al. |
| 7,287,760 B1 | 10/2007 | Quick et al. |
| 7,289,138 B2 | 10/2007 | Foote et al. |
| 7,292,867 B2 | 11/2007 | Werner et al. |
| 7,293,764 B2 | 11/2007 | Fang |
| 7,299,112 B2 | 11/2007 | LaPlante et al. |
| 7,306,206 B2 | 12/2007 | Turner |
| 7,316,406 B2 | 1/2008 | Kimura et al. |
| 7,325,660 B2 | 2/2008 | Norgaard et al. |
| 7,363,129 B1 | 4/2008 | Barnicle et al. |
| 7,374,028 B2 | 5/2008 | Fox |
| 7,397,355 B2 | 7/2008 | Tracy |
| 7,413,062 B2 | 8/2008 | Vandewal |
| 7,413,063 B1 | 8/2008 | Davis |
| 7,415,336 B1 | 8/2008 | Burch et al. |
| 7,422,092 B2 | 9/2008 | Hitchcock et al. |
| 7,441,638 B2 | 10/2008 | Hanawa |
| 7,469,910 B2 | 12/2008 | Münster et al. |
| 7,484,603 B2 | 2/2009 | Fox |
| 7,490,705 B2 | 2/2009 | Fox |
| 7,513,490 B2 | 4/2009 | Robertson |
| 7,523,617 B2 | 4/2009 | Colpitts et al. |
| 7,558,313 B2 | 7/2009 | Feher |
| 7,558,574 B2 | 7/2009 | Feher et al. |
| 7,566,290 B2 | 7/2009 | Lee et al. |
| 7,569,952 B1 | 8/2009 | Bono et al. |
| 7,581,743 B2 | 9/2009 | Graney et al. |
| 7,591,352 B2 | 9/2009 | Hanawa |
| 7,600,616 B2 | 10/2009 | Anderfaas et al. |
| 7,628,259 B2 | 12/2009 | Norgaard et al. |
| 7,628,414 B2 | 12/2009 | Dobson et al. |
| 7,631,882 B2 | 12/2009 | Hirao et al. |
| 7,654,369 B2 | 2/2010 | Murray et al. |
| 7,673,936 B2 | 3/2010 | Hsu |
| 7,684,911 B2 | 3/2010 | Seifert et al. |
| 7,694,785 B2 | 4/2010 | Nakadate |
| 7,694,987 B2 | 4/2010 | McAndrews |
| 7,699,753 B2 | 4/2010 | Daikeler et al. |
| 7,703,585 B2 | 4/2010 | Fox |
| 7,722,056 B2 | 5/2010 | Inoue et al. |
| 7,722,069 B2 | 5/2010 | Shirai |
| 7,726,042 B2 | 6/2010 | Meschan |
| 7,730,906 B2 | 6/2010 | Kleinert et al. |
| 7,736,272 B2 | 6/2010 | Martens |

(56) References Cited

U.S. PATENT DOCUMENTS

| | | |
|---|---|---|
| 7,764,990 B2 | 7/2010 | Martikka et al. |
| 7,766,794 B2 | 8/2010 | Oliver et al. |
| 7,770,701 B1 | 8/2010 | Davis |
| 7,775,128 B2 | 8/2010 | Roessingh et al. |
| 7,779,974 B2 | 8/2010 | Timoney et al. |
| 7,795,711 B2 | 9/2010 | Sauciuc et al. |
| 7,828,125 B2 | 11/2010 | Sekiya et al. |
| 7,828,126 B2 | 11/2010 | Lun |
| 7,837,213 B2 | 11/2010 | Colegrove et al. |
| 7,840,346 B2 | 11/2010 | Huhtala et al. |
| 7,841,258 B2 | 11/2010 | Komatsu et al. |
| 7,845,602 B1 | 12/2010 | Young et al. |
| 7,857,325 B2 | 12/2010 | Copsey et al. |
| 7,872,764 B2 | 1/2011 | Higgins-Luthman et al. |
| 7,874,567 B2 | 1/2011 | Ichida et al. |
| 7,901,292 B1 | 3/2011 | Uhlir et al. |
| 7,909,348 B2 | 3/2011 | Klieber et al. |
| 7,927,253 B2 | 4/2011 | DiBenedetto et al. |
| 7,931,132 B2 | 4/2011 | Braun |
| 7,931,563 B2 | 4/2011 | Shaw et al. |
| 7,946,163 B2 | 5/2011 | Gartner |
| 7,975,814 B2 | 7/2011 | Soederdahl |
| 8,016,349 B2 | 9/2011 | Mouri et al. |
| 8,021,270 B2 | 9/2011 | D'Eredita |
| 8,042,427 B2 | 10/2011 | Kawakami et al. |
| 8,056,392 B2 | 11/2011 | Ryan et al. |
| 8,069,964 B2 | 12/2011 | Deferme et al. |
| 8,087,676 B2 | 1/2012 | McIntyre |
| 8,091,910 B2 | 1/2012 | Hara et al. |
| 8,104,591 B2 | 1/2012 | Barefoot et al. |
| 8,121,757 B2 | 2/2012 | Extance et al. |
| 8,121,785 B2 | 2/2012 | Swisher et al. |
| 8,127,900 B2 | 3/2012 | Inoue |
| 8,136,877 B2 | 3/2012 | Walsh et al. |
| 8,141,438 B2 | 3/2012 | Roessingh et al. |
| 8,151,952 B2 | 4/2012 | Lenz et al. |
| 8,191,964 B2 | 6/2012 | Hsu et al. |
| 8,201,476 B2 | 6/2012 | Tsumiyama |
| 8,210,106 B2 | 7/2012 | Tai et al. |
| 8,210,330 B2 | 7/2012 | Vandewal |
| 8,246,065 B1 | 8/2012 | Kodama et al. |
| 8,256,587 B2 | 9/2012 | Bakke et al. |
| 8,256,732 B1 | 9/2012 | Young et al. |
| 8,262,058 B2 | 9/2012 | Kot |
| 8,262,062 B2 | 9/2012 | Kamo et al. |
| 8,262,100 B2 | 9/2012 | Fhomas |
| 8,265,825 B2 | 9/2012 | Kajino et al. |
| 8,285,447 B2 | 10/2012 | Bennett et al. |
| 8,286,982 B2 | 10/2012 | Plantet et al. |
| 8,291,889 B2 | 10/2012 | Shafer et al. |
| 8,292,274 B2 | 10/2012 | Adoline et al. |
| 8,307,965 B2 | 11/2012 | Föster et al. |
| 8,308,124 B2 | 11/2012 | Hsu |
| 8,317,261 B2 | 11/2012 | Walsh et al. |
| 8,328,454 B2 | 12/2012 | McAndrews et al. |
| 8,336,683 B2 | 12/2012 | McAndrews et al. |
| 8,364,389 B2 | 1/2013 | Dorogusker et al. |
| 8,393,446 B2 | 3/2013 | Haugen |
| 8,413,773 B2 | 4/2013 | Anderfaas et al. |
| 8,423,244 B2 | 4/2013 | Proemm et al. |
| 8,430,770 B2 | 4/2013 | Dugan et al. |
| 8,458,080 B2 | 6/2013 | Shirai |
| 8,480,064 B2 | 7/2013 | Talavasek |
| 8,550,223 B2 | 10/2013 | Cox et al. |
| 8,550,551 B2 | 10/2013 | Shirai |
| 8,556,048 B2 | 10/2013 | Maeda et al. |
| 8,556,049 B2 | 10/2013 | Jee |
| 8,596,663 B2 | 12/2013 | Shirai et al. |
| 8,616,351 B2 | 12/2013 | Roessle et al. |
| 8,622,180 B2 | 1/2014 | Wootten et al. |
| 8,627,932 B2 | 1/2014 | Marking |
| 8,641,073 B2 | 2/2014 | Lee et al. |
| 8,651,251 B2 | 2/2014 | Preukschat et al. |
| 8,655,548 B2 | 2/2014 | Ichida et al. |
| 8,727,947 B2 | 5/2014 | Tagliabue |
| 8,744,699 B2 | 6/2014 | Hamaguchi et al. |
| 8,752,682 B2 | 6/2014 | Park et al. |
| 8,763,770 B2 | 7/2014 | Marking |
| 8,770,357 B2 | 7/2014 | Sims et al. |
| 8,781,680 B2 | 7/2014 | Ichida et al. |
| 8,781,690 B2 | 7/2014 | Hara et al. |
| 8,814,109 B2 | 8/2014 | Calendrille et al. |
| 8,833,786 B2 | 9/2014 | Camp et al. |
| 8,838,335 B2 | 9/2014 | Bass et al. |
| 8,845,496 B2 | 9/2014 | Arrasvuori et al. |
| 8,857,580 B2 | 10/2014 | Marking |
| 8,868,253 B2 | 10/2014 | Hashimoto et al. |
| 8,888,115 B2 | 11/2014 | Chubbuck et al. |
| 8,935,036 B1 | 1/2015 | Christensen et al. |
| 8,936,139 B2 | 1/2015 | Galasso et al. |
| 8,950,771 B2 | 2/2015 | Felsl et al. |
| 8,955,653 B2 | 2/2015 | Marking |
| 8,967,343 B2 | 3/2015 | Battlogg et al. |
| 8,985,594 B2 | 3/2015 | Yabumoto |
| 8,991,571 B2 | 3/2015 | Murakami |
| 9,033,122 B2 | 5/2015 | Ericksen et al. |
| 9,038,791 B2 | 5/2015 | Marking |
| 9,047,778 B1 | 6/2015 | Cazanas et al. |
| 9,057,416 B2 | 6/2015 | Talavasek |
| 9,073,592 B2 | 7/2015 | Hsu |
| 9,103,400 B2 | 8/2015 | Becker |
| 9,108,098 B2 | 8/2015 | Galasso et al. |
| 9,120,362 B2 | 9/2015 | Marking |
| 9,126,647 B2 | 9/2015 | Kuo |
| 9,140,325 B2 | 9/2015 | Cox et al. |
| 9,157,523 B2 | 10/2015 | Miki et al. |
| 9,186,949 B2 | 11/2015 | Galasso et al. |
| 9,194,456 B2 | 11/2015 | Laird et al. |
| 9,199,690 B2 | 12/2015 | Watarai |
| 9,229,712 B2 | 1/2016 | Takamoto et al. |
| 9,239,090 B2 | 1/2016 | Marking et al. |
| 9,278,598 B2 | 3/2016 | Galasso et al. |
| 9,303,712 B2 | 4/2016 | Cox |
| 9,353,818 B2 | 5/2016 | Marking |
| 9,366,307 B2 | 6/2016 | Marking |
| 9,415,659 B2 | 8/2016 | Kikuchi et al. |
| 9,422,018 B2 | 8/2016 | Pelot et al. |
| 9,422,025 B2 | 8/2016 | Pezzi et al. |
| 9,452,654 B2 | 9/2016 | Ericksen et al. |
| 9,523,406 B2 | 12/2016 | Galasso et al. |
| 9,528,565 B2 | 12/2016 | Marking |
| 9,550,405 B2 | 1/2017 | Marking et al. |
| 9,556,925 B2 | 1/2017 | Marking |
| 9,616,728 B2 | 4/2017 | Marking |
| 9,650,094 B2 | 5/2017 | Laird et al. |
| 9,663,181 B2 | 5/2017 | Ericksen et al. |
| 9,682,604 B2 | 6/2017 | Cox et al. |
| 9,784,333 B2 | 10/2017 | Marking |
| 9,810,282 B2 | 11/2017 | Roessle et al. |
| 9,975,598 B2 | 5/2018 | Bender et al. |
| 10,029,172 B2 | 7/2018 | Galasso et al. |
| 10,036,443 B2 | 7/2018 | Galasso et al. |
| 10,040,328 B2 | 8/2018 | Marking |
| 10,040,329 B2 | 8/2018 | Ericksen et al. |
| 10,054,185 B2 | 8/2018 | Cox |
| 10,072,724 B2 | 9/2018 | Haugen et al. |
| 10,086,670 B2 | 10/2018 | Galasso et al. |
| 10,089,868 B1 | 10/2018 | Hayward |
| 10,094,443 B2 | 10/2018 | Marking |
| 10,145,435 B2 | 12/2018 | Galasso et al. |
| 10,180,171 B2 | 1/2019 | Laird et al. |
| 10,330,171 B2 | 6/2019 | Cox et al. |
| 10,336,148 B2 | 7/2019 | Ericksen et al. |
| 10,336,149 B2 | 7/2019 | Ericksen et al. |
| 10,677,309 B2 * | 6/2020 | Ericksen .................. F16F 9/46 |
| 2001/0017334 A1 | 8/2001 | Vincent |
| 2001/0022621 A1 | 9/2001 | Squibbs |
| 2001/0030408 A1 | 10/2001 | Miyoshi et al. |
| 2001/0042663 A1 | 11/2001 | Marking et al. |
| 2001/0055373 A1 | 12/2001 | Yamashita |
| 2002/0000352 A1 | 1/2002 | Matsumoto et al. |
| 2002/0032508 A1 | 3/2002 | Uchino et al. |
| 2002/0045987 A1 | 4/2002 | Ohata et al. |
| 2002/0050112 A1 | 5/2002 | Koch et al. |

(56) References Cited

U.S. PATENT DOCUMENTS

| | | |
|---|---|---|
| 2002/0050518 A1 | 5/2002 | Roustaei |
| 2002/0053493 A1 | 5/2002 | Sintorn et al. |
| 2002/0055422 A1 | 5/2002 | Airmet et al. |
| 2002/0063469 A1 | 5/2002 | Nishio |
| 2002/0089107 A1 | 7/2002 | Koh |
| 2002/0095979 A1 | 7/2002 | Shirato et al. |
| 2002/0113347 A1 | 8/2002 | Robbins et al. |
| 2002/0121416 A1 | 9/2002 | Katayama et al. |
| 2002/0130000 A1 | 9/2002 | Lisenker et al. |
| 2002/0130003 A1 | 9/2002 | Lisenker et al. |
| 2002/0185581 A1 | 12/2002 | Trask et al. |
| 2002/0187867 A1 | 12/2002 | Ichida et al. |
| 2003/0001346 A1 | 1/2003 | Hamilton et al. |
| 2003/0001358 A1 | 1/2003 | Becker et al. |
| 2003/0034697 A1 | 2/2003 | Goldner et al. |
| 2003/0040348 A1 | 2/2003 | Martens et al. |
| 2003/0051954 A1 | 3/2003 | Sendrea |
| 2003/0054327 A1 | 3/2003 | Evensen et al. |
| 2003/0065430 A1 | 4/2003 | Lu et al. |
| 2003/0075403 A1 | 4/2003 | Dernebo |
| 2003/0103651 A1 | 6/2003 | Novak |
| 2003/0128275 A1 | 7/2003 | Maguire |
| 2003/0160369 A1 | 8/2003 | Laplante et al. |
| 2003/0191567 A1 | 10/2003 | Gentilcore |
| 2003/0216845 A1 | 11/2003 | Williston |
| 2004/0004659 A1 | 1/2004 | Foote et al. |
| 2004/0017455 A1 | 1/2004 | Kremers et al. |
| 2004/0021754 A1 | 2/2004 | Kremers et al. |
| 2004/0075350 A1 | 4/2004 | Kuhnel |
| 2004/0091111 A1 | 5/2004 | Levy et al. |
| 2004/0099312 A1 | 5/2004 | Boyer et al. |
| 2004/0103146 A1 | 5/2004 | Park |
| 2004/0172178 A1 | 9/2004 | Takeda et al. |
| 2004/0208687 A1 | 10/2004 | Sicz et al. |
| 2004/0220708 A1 | 11/2004 | Owen et al. |
| 2004/0220712 A1 | 11/2004 | Takeda et al. |
| 2004/0222056 A1 | 11/2004 | Fox |
| 2004/0256778 A1 | 12/2004 | Verriet |
| 2005/0055156 A1 | 3/2005 | Maltagliati et al. |
| 2005/0077131 A1 | 4/2005 | Russell |
| 2005/0098401 A1 | 5/2005 | Hamilton et al. |
| 2005/0107216 A1 | 5/2005 | Lee et al. |
| 2005/0110229 A1 | 5/2005 | Kimura et al. |
| 2005/0121269 A1 | 6/2005 | Namuduri |
| 2005/0173849 A1 | 8/2005 | Vandewal |
| 2005/0195094 A1 | 9/2005 | White |
| 2005/0199455 A1 | 9/2005 | Browne et al. |
| 2005/0216186 A1 | 9/2005 | Dorfman et al. |
| 2005/0227798 A1 | 10/2005 | Ichida et al. |
| 2005/0239601 A1 | 10/2005 | Thomas |
| 2005/0288154 A1 | 12/2005 | Lee et al. |
| 2006/0040793 A1 | 2/2006 | Martens et al. |
| 2006/0064223 A1 | 3/2006 | Voss |
| 2006/0065496 A1 | 3/2006 | Fox |
| 2006/0066074 A1 | 3/2006 | Turner et al. |
| 2006/0076757 A1 | 4/2006 | Bromley |
| 2006/0081431 A1 | 4/2006 | Breese et al. |
| 2006/0096817 A1 | 5/2006 | Norgaard et al. |
| 2006/0113834 A1 | 6/2006 | Hanawa |
| 2006/0124414 A1 | 6/2006 | Hanawa |
| 2006/0136173 A1 | 6/2006 | Case et al. |
| 2006/0137934 A1 | 6/2006 | Kurth |
| 2006/0163551 A1 | 7/2006 | Coenen et al. |
| 2006/0163787 A1 | 7/2006 | Munster et al. |
| 2006/0175792 A1 | 8/2006 | Sicz et al. |
| 2006/0176216 A1 | 8/2006 | Hipskind |
| 2006/0185951 A1 | 8/2006 | Tanaka |
| 2006/0213082 A1 | 9/2006 | Meschan |
| 2006/0219503 A1 | 10/2006 | Kim |
| 2006/0225976 A1 | 10/2006 | Nakadate |
| 2006/0237272 A1 | 10/2006 | Huang |
| 2006/0253210 A1 | 11/2006 | Rosenberg |
| 2006/0289258 A1 | 12/2006 | Fox |
| 2007/0006489 A1 | 1/2007 | Case et al. |
| 2007/0007743 A1 | 1/2007 | Becker et al. |
| 2007/0008096 A1 | 1/2007 | Tracy |
| 2007/0021885 A1 | 1/2007 | Soehren |
| 2007/0032981 A1 | 2/2007 | Merkel et al. |
| 2007/0034464 A1 | 2/2007 | Barefoot |
| 2007/0039790 A1 | 2/2007 | Timoney et al. |
| 2007/0051573 A1 | 3/2007 | Norgaard et al. |
| 2007/0070069 A1 | 3/2007 | Samarasekera et al. |
| 2007/0080515 A1 | 4/2007 | McAndrews et al. |
| 2007/0088475 A1 | 4/2007 | Nordgren et al. |
| 2007/0090518 A1 | 4/2007 | Sauciuc et al. |
| 2007/0119669 A1 | 5/2007 | Anderfaas et al. |
| 2007/0170688 A1 | 7/2007 | Watson |
| 2007/0199401 A1 | 8/2007 | Kawakami et al. |
| 2007/0213126 A1 | 9/2007 | Deutsch et al. |
| 2007/0239479 A1 | 10/2007 | Arrasvuori et al. |
| 2007/0260372 A1 | 11/2007 | Langer |
| 2007/0272458 A1 | 11/2007 | Taniguchi et al. |
| 2008/0006494 A1 | 1/2008 | Vandewal |
| 2008/0009992 A1 | 1/2008 | Izawa et al. |
| 2008/0015089 A1 | 1/2008 | Hurwitz et al. |
| 2008/0018065 A1 | 1/2008 | Hirao et al. |
| 2008/0029730 A1 | 2/2008 | Kamo et al. |
| 2008/0041677 A1 | 2/2008 | Namuduri |
| 2008/0059025 A1 | 3/2008 | Furuichi et al. |
| 2008/0067019 A1 | 3/2008 | Jensen et al. |
| 2008/0093820 A1 | 4/2008 | McAndrews |
| 2008/0096726 A1 | 4/2008 | Riley et al. |
| 2008/0099968 A1 | 5/2008 | Schroeder |
| 2008/0109158 A1 | 5/2008 | Huhtala et al. |
| 2008/0116622 A1 | 5/2008 | Fox |
| 2008/0119330 A1 | 5/2008 | Chiang et al. |
| 2008/0163718 A1 | 7/2008 | Chiang |
| 2008/0185244 A1 | 8/2008 | Maeda et al. |
| 2008/0200310 A1 | 8/2008 | Tagliabue |
| 2008/0250844 A1 | 10/2008 | Gartner |
| 2008/0254944 A1 | 10/2008 | Muri et al. |
| 2008/0303320 A1 | 12/2008 | Schranz et al. |
| 2008/0312799 A1 | 12/2008 | Miglioranza |
| 2008/0314706 A1 | 12/2008 | Lun et al. |
| 2009/0000885 A1 | 1/2009 | McAndrews |
| 2009/0001684 A1 | 1/2009 | McAndrews et al. |
| 2009/0020382 A1 | 1/2009 | Van Weelden et al. |
| 2009/0038897 A1 | 2/2009 | Murakami |
| 2009/0048070 A1 | 2/2009 | Vincent et al. |
| 2009/0069972 A1 | 3/2009 | Templeton et al. |
| 2009/0070037 A1 | 3/2009 | Templeton et al. |
| 2009/0071772 A1 | 3/2009 | Cho et al. |
| 2009/0071773 A1 | 3/2009 | Lun |
| 2009/0098981 A1 | 4/2009 | Del et al. |
| 2009/0118100 A1 | 5/2009 | Oliver et al. |
| 2009/0121398 A1 | 5/2009 | Inoue |
| 2009/0131224 A1 | 5/2009 | Yuen |
| 2009/0134595 A1* | 5/2009 | Haller ............... B60G 17/0416 280/124.157 |
| 2009/0138157 A1 | 5/2009 | Hagglund et al. |
| 2009/0171532 A1 | 7/2009 | Ryan et al. |
| 2009/0192673 A1 | 7/2009 | Song et al. |
| 2009/0200126 A1 | 8/2009 | Kondo et al. |
| 2009/0236807 A1 | 9/2009 | Wootten et al. |
| 2009/0258710 A1 | 10/2009 | Quatrochi et al. |
| 2009/0261542 A1 | 10/2009 | McIntyre |
| 2009/0277736 A1 | 11/2009 | McAndrews et al. |
| 2009/0288924 A1 | 11/2009 | Murray et al. |
| 2009/0294231 A1 | 12/2009 | Carlson et al. |
| 2009/0302558 A1 | 12/2009 | Shirai |
| 2009/0324327 A1 | 12/2009 | McAndrews et al. |
| 2010/0004097 A1 | 1/2010 | D'Eredita |
| 2010/0010709 A1 | 1/2010 | Song |
| 2010/0025946 A1 | 2/2010 | Inoue et al. |
| 2010/0032254 A1 | 2/2010 | Anderfaas et al. |
| 2010/0044975 A1 | 2/2010 | Yablon et al. |
| 2010/0059964 A1 | 3/2010 | Morris |
| 2010/0066051 A1 | 3/2010 | Haugen |
| 2010/0109277 A1 | 5/2010 | Furrer |
| 2010/0133764 A1 | 6/2010 | Greaves |
| 2010/0139442 A1 | 6/2010 | Tsumiyama |
| 2010/0147640 A1 | 6/2010 | Jones et al. |
| 2010/0160014 A1 | 6/2010 | Galasso et al. |
| 2010/0170760 A1 | 7/2010 | Marking |

(56) References Cited

U.S. PATENT DOCUMENTS

| | | |
|---|---|---|
| 2010/0186836 A1 | 7/2010 | Yoshihiro et al. |
| 2010/0198453 A1 | 8/2010 | Dorogusker et al. |
| 2010/0207351 A1 | 8/2010 | Klieber et al. |
| 2010/0224454 A1 | 9/2010 | Chen et al. |
| 2010/0244340 A1 | 9/2010 | Wootten et al. |
| 2010/0252972 A1 | 10/2010 | Cox et al. |
| 2010/0276238 A1 | 11/2010 | Crasset |
| 2010/0276906 A1 | 11/2010 | Galasso et al. |
| 2010/0308628 A1 | 12/2010 | Hsu et al. |
| 2010/0314917 A1 | 12/2010 | Hsieh et al. |
| 2010/0326780 A1 | 12/2010 | Murakami |
| 2010/0327542 A1 | 12/2010 | Hara et al. |
| 2011/0067965 A1 | 3/2011 | McAndrews |
| 2011/0086686 A1 | 4/2011 | Avent et al. |
| 2011/0095507 A1 | 4/2011 | Planiei et al. |
| 2011/0097139 A1 | 4/2011 | Hsu et al. |
| 2011/0109060 A1 | 5/2011 | Earle et al. |
| 2011/0127706 A1 | 6/2011 | Sims et al. |
| 2011/0174582 A1 | 7/2011 | Wootten et al. |
| 2011/0202236 A1 | 8/2011 | Galasso et al. |
| 2011/0204201 A1 | 8/2011 | Kodama et al. |
| 2011/0214956 A1 | 9/2011 | Marking |
| 2011/0257848 A1 | 10/2011 | Shirai |
| 2011/0284333 A1 | 11/2011 | Krog et al. |
| 2011/0315494 A1 | 12/2011 | Marking |
| 2012/0006949 A1 | 1/2012 | Laird et al. |
| 2012/0007327 A1 | 1/2012 | Talavasek |
| 2012/0018263 A1 | 1/2012 | Marking |
| 2012/0018264 A1 | 1/2012 | King |
| 2012/0048665 A1 | 3/2012 | Marking |
| 2012/0074660 A1 | 3/2012 | Thomas |
| 2012/0080279 A1 | 4/2012 | Galasso et al. |
| 2012/0136537 A1 | 5/2012 | Galasso et al. |
| 2012/0181126 A1 | 7/2012 | De Kock |
| 2012/0221228 A1 | 8/2012 | Noumura et al. |
| 2012/0222927 A1 | 9/2012 | Marking |
| 2012/0228906 A1 | 9/2012 | McAndrews et al. |
| 2012/0253599 A1 | 10/2012 | Shirai |
| 2012/0253600 A1 | 10/2012 | Ichida et al. |
| 2012/0274043 A1 | 11/2012 | Lee et al. |
| 2012/0305350 A1 | 12/2012 | Ericksen et al. |
| 2012/0312648 A1 | 12/2012 | Yu et al. |
| 2013/0001030 A1 | 1/2013 | Goldasz et al. |
| 2013/0037361 A1 | 2/2013 | Park et al. |
| 2013/0090195 A1 | 4/2013 | Yamaguchi et al. |
| 2013/0119634 A1 | 5/2013 | Camp et al. |
| 2013/0144489 A1 | 6/2013 | Galasso et al. |
| 2013/0168195 A1 | 7/2013 | Park et al. |
| 2013/0220110 A1 | 8/2013 | Zhan et al. |
| 2013/0221713 A1 | 8/2013 | Pelot et al. |
| 2013/0292218 A1 | 11/2013 | Ericksen et al. |
| 2013/0333993 A1 | 12/2013 | Yu |
| 2014/0008160 A1 | 1/2014 | Marking et al. |
| 2014/0027219 A1 | 1/2014 | Marking et al. |
| 2014/0048365 A1 | 2/2014 | Kim |
| 2014/0061419 A1 | 3/2014 | Wehage et al. |
| 2015/0073656 A1 | 3/2015 | Takamoto et al. |
| 2015/0081171 A1 | 3/2015 | Ericksen et al. |
| 2015/0141056 A1 | 5/2015 | Fefilatyev et al. |
| 2015/0175236 A1 | 6/2015 | Walthert et al. |
| 2015/0179062 A1 | 6/2015 | Ralston et al. |
| 2015/0197308 A1 | 7/2015 | Butora et al. |
| 2015/0233442 A1 | 8/2015 | Noguchi |
| 2015/0291248 A1 | 10/2015 | Fukao et al. |
| 2016/0025178 A1 | 1/2016 | Kamakura et al. |
| 2016/0031506 A1 | 2/2016 | Lloyd et al. |
| 2016/0076617 A1 | 3/2016 | Marking |
| 2016/0153515 A1 | 6/2016 | Ebersbach et al. |
| 2016/0153516 A1 | 6/2016 | Marking |
| 2016/0185178 A1 | 6/2016 | Galasso et al. |
| 2016/0200163 A1 | 7/2016 | Tsukahara |
| 2016/0265615 A1 | 9/2016 | Marking |
| 2016/0290431 A1 | 10/2016 | Marking |
| 2016/0319899 A1 | 11/2016 | Franklin et al. |
| 2016/0355226 A1 | 12/2016 | Pelot et al. |
| 2016/0364989 A1 | 12/2016 | Speasl et al. |
| 2017/0008363 A1 | 1/2017 | Ericksen et al. |
| 2017/0136843 A1 | 5/2017 | Marking |
| 2017/0184174 A1 | 6/2017 | Marking |
| 2017/0247072 A1 | 8/2017 | Laird et al. |
| 2017/0259876 A1 | 9/2017 | Ericksen et al. |
| 2017/0268595 A1 | 9/2017 | Inagaki et al. |
| 2017/0282669 A1 | 10/2017 | Cox et al. |
| 2017/0291466 A1 | 10/2017 | Tong |
| 2018/0010666 A1 | 1/2018 | Marking |
| 2018/0031071 A1 | 2/2018 | Marking |
| 2018/0118302 A1 | 5/2018 | Fukao et al. |
| 2018/0150764 A1 | 5/2018 | Stenneth |
| 2018/0156300 A1 | 6/2018 | Sakai |
| 2018/0174446 A1 | 6/2018 | Wang |
| 2018/0208011 A1 | 7/2018 | Wigg et al. |
| 2018/0222541 A1 | 8/2018 | Madau et al. |
| 2018/0304149 A1 | 10/2018 | Galasso et al. |
| 2018/0326805 A1 | 11/2018 | Marking |
| 2018/0326808 A1 | 11/2018 | Ericksen et al. |
| 2018/0328442 A1 | 11/2018 | Galasso et al. |
| 2018/0328446 A1 | 11/2018 | Ericksen et al. |
| 2018/0334007 A1 | 11/2018 | Ericksen et al. |
| 2018/0334008 A1 | 11/2018 | Ericksen et al. |
| 2018/0335102 A1 | 11/2018 | Haugen |
| 2018/0339565 A1 | 11/2018 | Ericksen et al. |
| 2018/0339566 A1 | 11/2018 | Ericksen et al. |
| 2018/0339567 A1 | 11/2018 | Ericksen et al. |
| 2018/0355943 A1 | 12/2018 | Cox |
| 2018/0355946 A1 | 12/2018 | Ericksen et al. |
| 2019/0030975 A1 | 1/2019 | Galasso et al. |
| 2019/0031264 A1 | 1/2019 | Laird et al. |
| 2019/0032745 A1 | 1/2019 | Marking |
| 2019/0176557 A1 | 6/2019 | Marking et al. |
| 2019/0184782 A1 | 6/2019 | Shaw et al. |
| 2019/0203798 A1 | 7/2019 | Cox et al. |
| 2019/0247744 A1 | 8/2019 | Galasso et al. |

FOREIGN PATENT DOCUMENTS

| | | |
|---|---|---|
| DE | 3613386 A1 | 10/1986 |
| DE | 3532292 A1 | 3/1987 |
| DE | 3709447 A1 | 10/1988 |
| DE | 3711442 A1 | 10/1988 |
| DE | 3738048 A1 | 5/1989 |
| DE | 3924166 C1 | 2/1991 |
| DE | 4029090 A1 | 3/1992 |
| DE | 4406918 A1 | 9/1994 |
| DE | 202004005229 U1 | 8/2004 |
| DE | 10326675 A1 | 12/2004 |
| DE | 102005025811 A1 | 12/2006 |
| DE | 102007063365 A1 | 7/2009 |
| DE | 202008015968 U1 | 4/2010 |
| DE | 202010012738 U1 | 12/2010 |
| EP | 207409 A2 | 1/1987 |
| EP | 304801 A2 | 3/1989 |
| EP | 3403803 A1 | 12/1990 |
| EP | 552568 A1 | 7/1993 |
| EP | 0735280 A2 | 10/1996 |
| EP | 1050696 A2 | 11/2000 |
| EP | 1138530 A2 | 10/2001 |
| EP | 1188661 A2 | 3/2002 |
| EP | 1241087 A1 | 9/2002 |
| EP | 1355209 A1 | 10/2003 |
| EP | 1394439 A1 | 3/2004 |
| EP | 1449688 A2 | 8/2004 |
| EP | 1623856 A2 | 2/2006 |
| EP | 1757473 A2 | 2/2007 |
| EP | 2103512 A2 | 9/2009 |
| EP | 2116739 A2 | 11/2009 |
| EP | 2189191 A2 | 5/2010 |
| EP | 2248691 A1 | 11/2010 |
| EP | 2357098 A2 | 8/2011 |
| EP | 2410203 A2 | 1/2012 |
| EP | 2479095 A2 | 7/2012 |
| EP | 2495472 A2 | 9/2012 |
| EP | 2357098 B1 | 10/2014 |
| EP | 2848582 A1 | 3/2015 |
| FR | 1343760 A | 11/1963 |

(56) References Cited

FOREIGN PATENT DOCUMENTS

| | | |
|---|---|---|
| FR | 2432424 A1 | 2/1980 |
| FR | 2529002 A2 | 12/1983 |
| FR | 2617928 A1 | 1/1989 |
| FR | 2952031 A1 | 5/2011 |
| GB | 2104183 A | 3/1983 |
| GB | 2159604 A | 12/1985 |
| GB | 2180320 A | 3/1987 |
| GB | 2190461 A | 11/1987 |
| GB | 2289111 A | 11/1995 |
| JP | 57173632 A | 10/1982 |
| JP | 57173632 U | 11/1982 |
| JP | 57182506 A | 11/1982 |
| JP | 01106721 A | 4/1989 |
| JP | H0193637 A | 4/1989 |
| JP | H02168038 A | 6/1990 |
| JP | H03113139 A | 5/1991 |
| JP | 04203540 A | 7/1992 |
| JP | 05149364 A | 6/1993 |
| JP | H05319054 A | 12/1993 |
| JP | 06101735 A | 4/1994 |
| JP | 06185562 A | 7/1994 |
| JP | H084818 A | 1/1996 |
| JP | 2005119548 A | 5/2005 |
| JP | 2005119549 A | 5/2005 |
| JP | 2007302211 A | 11/2007 |
| JP | 2008238921 A | 10/2008 |
| KR | 19980043226 U | 9/1998 |
| KR | 20070076226 A | 7/2007 |
| KR | 20100041679 A | 4/2010 |
| RU | 2469224 C1 | 12/2012 |
| WO | 9840231 A2 | 9/1998 |
| WO | 99/06231 | 2/1999 |
| WO | 0027658 A1 | 5/2000 |
| WO | 03070546 A1 | 8/2003 |
| WO | 2007017739 A2 | 2/2007 |
| WO | 2007117884 A2 | 10/2007 |
| WO | 2008086605 A1 | 7/2008 |
| WO | 2008114445 A1 | 9/2008 |
| WO | 2013066159 A1 | 5/2013 |

OTHER PUBLICATIONS

English language abstract for EP 0207409 (no date).
European Search Report, European Patent Application No. 14189773.6, dated May 4, 2015, 4 Pages.
EP Search Report for European Application No. 15163428.4, dated Jul. 3, 2017, 7 Pages.
"Communication Re Oral Proceedings for European Application No. 10161906, dated Feb. 13, 2013 (dated Feb. 13, 2015)".
"European Patent Office Final Decision dated Mar. 21, 2013", European Patent Application No. 10161906.2.
"European Search Report for European Application No. 10187320, 3 pages, dated Sep. 1, 2010."
"European Search Report for European Application No. 10187320, 12 pages, dated Sep. 25, 2017 (dated Sep. 25, 2017)."
European Search Report for European Application No. 11153607, 3 pages, dated Aug 1, 2012.
European Search Report for European Application No. 11172553, 2 pages, dated Sep. 15, 2017.
European Search Report for European Application No. 11175126, 2 pages, dated Sep. 15, 2017.
European Search Report for European Application No. 11275170, 2 pages, dated Dec. 22, 2017.
"European Search Report for European Application No. 12170370, 2 pages, dated Nov. 15, 2017 (dated Nov. 15, 2017)".
"European Search Report for European Application No. 12184150, 10 pages, dated Dec. 12, 2017 (dated Dec. 12, 2017)."
European Search Report for European Application No. 13158034, 4 pages, dated Jun. 20, 2013.
"European Search Report for European Application No. 13174817.0, 13 pages, dated Jan. 8, 2018 (dated Jan. 8, 2018)".
"European Search Report for European Application No. 13189574, 2 pages, dated Feb. 19, 2014 (dated Feb. 19, 2014)".
European Search Report for European Application No. 15167426, 4 pages, dated Aug. 27, 2015.
"European Search Report for European Application No. 17154191, 2 pages, dated Jun. 19, 2017."
"Office Action for European Application No. 13158034.2, 5 pages, dated May 22, 2014."
Nilsson, "Opposition Letter Against EP-2357098", Oct. 13, 2017, 7.
Smith, ""The Bump Stop" in Engineer to win—Chapter 13: Springs and Shock Absorbers", MBI Publishing Company and Motorbooks, USA XP055430818, ISBN: 978-0-87938-186-8, Dec. 31, 1984, 207.
Fachkunde Fahrradtechnik 4 Auflage, Gressmann_Inhaltv und S, 2011, 206-207.
Statement of Grounds of Appeal, EP App. No. 11153607.4, May 28, 2018, 88 Pages.
Grounds of Appeal, EP App. No. 11153607.4, Jun. 1, 2018, 28 Pages.
"European Search Report for European Application No. 11172612, 2 pages, dated Sep. 22, 2011".
"European Search Report for European Application No. 16167306, 2 pages, dated Mar. 16, 2017".
"European Search Report for European Application No. 17188022, 9 pages, dated Feb. 1, 2018".
"The Lee Company Technical Hydraulic Handbook", 1996, 1-696.
Healey, "The Tyre as Part of the Suspension System", The Institution of Automobile Engineers, Nov. 1924, 26-128.
Kasprzak, "Understanding Your Dampers: A guide from Jim Kasprzak", http://www.kaztechnologies.com/downloads/kaz-tech-tips/ Accessed: Oct. 24, 2018, 25 pages.
Litchfield, "Pneumatic Tires", Transactions (Society of Automobile Engineers), vol. 8, Part II, 1913, 208-223.
Puhn, "How To Make Your Car Handle", HPBooks, 1981, 7 Pages.
Waechter, et al., "A Multibody Model for the Simulation of Bicycle Suspension Systems", Vehicle System Dynamics, vol. 37, No. 1, 2002, 3-28.
European Search Report for European Application No. 19193903.2, 6 pages, dated Oct. 19, 2021 (dated Oct. 19, 2021).
EP Search Report for European Application No. 21173940.4, dated Nov. 12, 2021, 9 Pages.
European Search Report for European Application No. 19155995, 11 pages, dated Aug. 28, 2019.
European Search Report for European Application No. 19206334.5, 6 pages, dated May 12, 2020 (dated May 12, 2020).
European Search Report for European Application No. 19212356.0, 8 pages, dated May 7, 2020 (dated May 7, 2020).
Machine translation DE3613386; Oct. 1986.
Machine translation EP 0403803; Dec. 1990.
Machine translation KR20100041679; Apr. 2010.
European Search Report for European Application No. 19157767, filed Oct. 16, 2019, 9 Pages.
"17 Years of Innovation and Still Evolving", https//www.powertap.com/post/blog-15-17-years-of-innovation-and-still-evolving, Nov. 28, 2018, 8 Pages.
"ANT Message Protocol and Usage", Dynastream Innovations, Inc., Jul. 2, 2007, 68 Pages.
"Basis For Claims Filed Jan. 23, 2015", European Patent Application No. 14189773.6, 2 Pages.
"European Search Report for European Application No. 09177128, 4 pages, dated Aug. 25, 2010 (dated Aug. 25, 2010)".
"European Search Report and Written Opinion, European Patent Application No. 13165362.8", dated Sep. 24, 2014, 6 Pages.
"European Search Report for EP Application No. 18154672, 3 pages, dated Aug. 28, 2018 (dated Aug. 28, 2018))".
"Notice of Intent to Grant EP Application 09159949.8 dated Nov. 14, 2019, pp. 48".
Kensuke, Suspension Control Device, machine translation of JPH05319054 (A), Dec. 3, 1993 (Year: 1993).
Shiozaki, et al., "SP-861-Vehicle Dynamics and Electronic Controlled Suspensions SAE Technical Paper Series No. 910661", International Congress and Exposition, Detroit, Mich., Feb. 25-Mar. 1, 1991.

(56) References Cited

OTHER PUBLICATIONS

Thum, Notice of Opposition to a European Patent, EP App. No. 14189773.6, Dec. 13, 2018, 49 Pages.
Thum, "Oppostion Letter Against EP2357098", Oct. 16, 2018, 39.
Thum, "Oppostion Letter Against EP2357098", Dec. 17, 2019, 25 Pages.
Haller, E, EPO machine translation of CN 101468587 (A) Device with a suspension system and method for selling a suspension system, published on Jul. 1, 2009.

\* cited by examiner

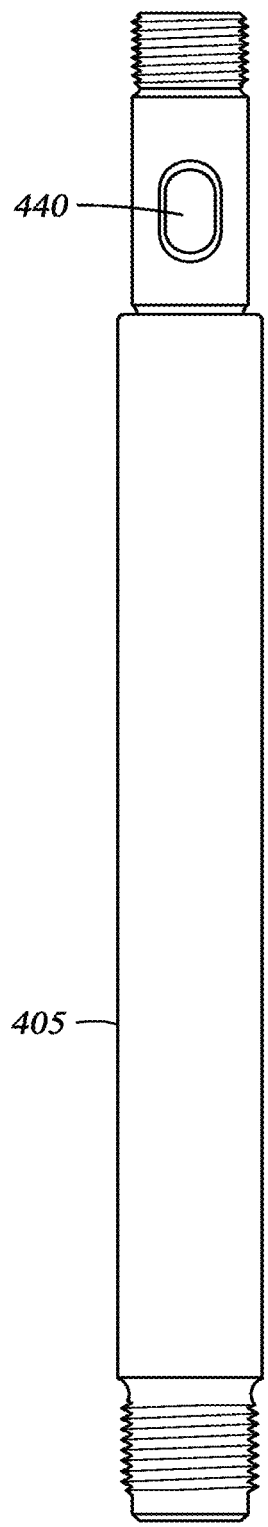 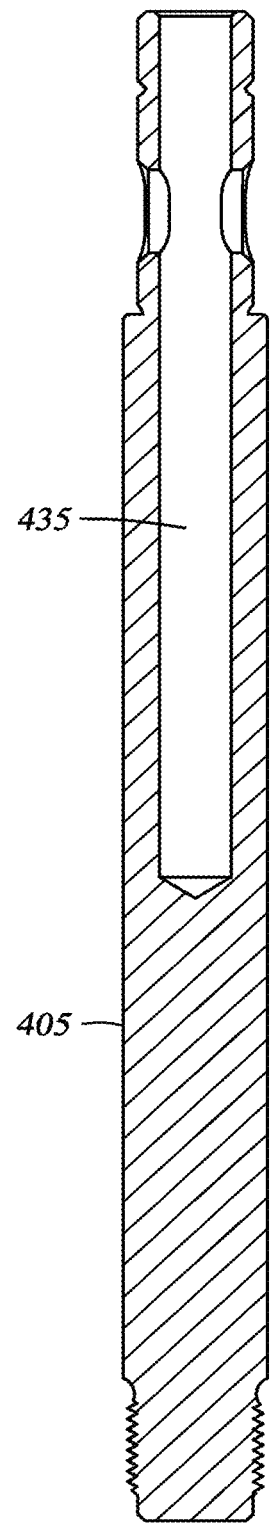
*Fig. 8A*  *Fig. 8B*

METHODS AND APPARATUS FOR POSITION SENSITIVE SUSPENSION DAMPING

CROSS-REFERENCE TO RELATED APPLICATIONS

This application claims priority to and is a Continuation of the patent application Ser. No. 14/506,420, entitled "METHODS AND APPARATUS FOR POSITION SENSITIVE SUSPENSION DAMPING," with filing date Oct. 3, 2014, by Everet Owen Ericksen et al., which is incorporated herein, in its entirety, by reference.

The application with Ser. No. 14/506,420 claims priority to and is a Divisional of the patent application Ser. No. 13/485,401, entitled "METHODS AND APPARATUS FOR POSITION SENSITIVE SUSPENSION DAMPING", with filing date May 31, 2012, by Everet Owen Ericksen et al., which is incorporated herein, in its entirety, by reference.

The application with Ser. No. 13/485,401 claims priority to the patent application, Ser. No. 61/491,858, entitled "METHODS AND APPARATUS FOR POSITION SENSITIVE SUSPENSION DAMPING", with filing date May 31, 2011, by Everet Owen Ericksen et al., which is incorporated herein, in its entirety, by reference.

BACKGROUND OF THE INVENTION

Field of the Invention

The invention relates generally to vehicle suspensions and, more specifically, to variable damping rates in vehicle shock absorbers and forks.

Description of the Related Art

Vehicle suspension systems typically include a spring component or components and a damping component or components. Often, mechanical springs, like helical springs, are used with some type of viscous fluid-based damping mechanism, the spring and damper being mounted functionally in parallel. In some instances a spring may comprise pressurized gas and features of the damper or spring are user-adjustable, such as by adjusting the air pressure in a gas spring. A damper may be constructed by placing a damping piston in a fluid-filled cylinder (e.g., liquid such as oil). As the damping piston is moved in the cylinder, fluid is compressed and passes from one side of the piston to the other side. Often, the piston includes vents there-through which may be covered by shim stacks to provide for different operational characteristics in compression or extension.

Conventional damping components provide a constant damping rate during compression or extension through the entire length of the stroke. As the suspension component nears full compression or full extension, the damping piston can "bottom out" against the end of the damping cylinder. Allowing the damping components to "bottom out" may cause the components to deform or break inside the damping cylinder.

As the foregoing illustrates, what is needed in the art are improved techniques for varying the damping rate including to lessen the risk of the suspension "bottoming out."

SUMMARY OF THE INVENTION

One embodiment of the present disclosure sets forth a vehicle suspension damper that includes a cylinder having a compression chamber and a rebound chamber and containing at least a portion of a piston rod having a piston attached thereto, where an outer diameter of the piston engages an inner diameter of the cylinder and is relatively movable therein, and where the piston borders each of the compression chamber and the rebound chamber. The vehicle suspension damper further includes a damping liquid within the cylinder and a bypass fluid flow path connecting the compression chamber and the rebound chamber, which forms a fluid path extending between an inner diameter of the piston and a side surface of the piston directly bordering one of the compression or rebound chambers.

Another embodiment of the present disclosure sets forth a vehicle suspension damper that includes a cylinder and a damping liquid within the cylinder, the cylinder having a compression chamber and a rebound chamber and containing at least a portion of a piston rod having a piston attached thereto, where an outer diameter of the piston engages an inner diameter of the cylinder and is relatively movable therein, and where the piston borders each of the compression chamber and the rebound chamber. The piston includes multiple flow paths that enable the damping liquid to flow from the compression chamber to the rebound chamber. The multiple flow paths include a damping flow path that comprises a first fluid path extending between a first side surface of the piston directly bordering the compression chamber and a second side surface of the piston directly bordering the rebound chamber and a bypass flow path that comprises a fluid path extending between an inner diameter of the piston and one of the first side surface of the piston or the second side surface of the piston.

Yet another embodiment of the present disclosure sets forth a vehicle suspension system that includes a first damper unit. The first damper unit includes a cylinder having a compression chamber and a rebound chamber and containing at least a portion of a piston rod having a piston attached thereto, wherein an outer diameter of the piston engages an inner diameter of the cylinder and is relatively movable therein, and wherein the piston borders each of the compression chamber and the rebound chamber. The first damper unit further includes a damping liquid within the cylinder and a bypass fluid flow path connecting the compression chamber and the rebound chamber, which forms a fluid path extending between an inner diameter of the piston and a side surface of the piston directly bordering one of the compression or rebound chambers.

One advantage of some disclosed embodiments is that multiple bypass flow paths enable the vehicle suspension damper to be setup such that the damping rate changes (i.e., is increased) as the damper nears full compression. The increased damping rate, caused by fluid being forced through fewer flow paths formed by the multiple bypass flow paths causes the force opposing further compression of the damper to increase, thereby decreasing the chance that the damper "bottoms out."

BRIEF DESCRIPTION OF THE DRAWINGS

So that the manner in which the above recited features can be understood in detail, a more particular description, briefly summarized above, may be had by reference to certain example embodiments, some of which are illustrated in the appended drawings. It is to be noted, however, that the appended drawings illustrate only typical embodiments and are therefore not to be considered limiting the scope of the claims, which may admit to other equally effective embodiments.

FIGS. 8A and 8B illustrate the shaft of FIG. 6, according to one example embodiment.

For clarity, identical reference numbers have been used, where applicable, to designate identical elements that are common between figures. It is contemplated that features of one example embodiment may be incorporated in other example embodiments without further recitation.

DETAILED DESCRIPTION

Integrated damper/spring vehicle shock absorbers often include a damper body surrounded by or used in conjunction with a mechanical spring or constructed in conjunction with an air spring or both. The damper often consists of a piston and shaft telescopically mounted in a fluid filled cylinder. The damping fluid (i.e., damping liquid) or damping liquid may be, for example, hydraulic oil. A mechanical spring may be a helically wound spring that surrounds or is mounted in parallel with the damper body. Vehicle suspension systems typically include one or more dampers as well as one or more springs mounted to one or more vehicle axles. As used herein, the terms "down", "up", "downward", "upward", "lower", "upper", and other directional references are relative and are used for reference only.

Figure 1:
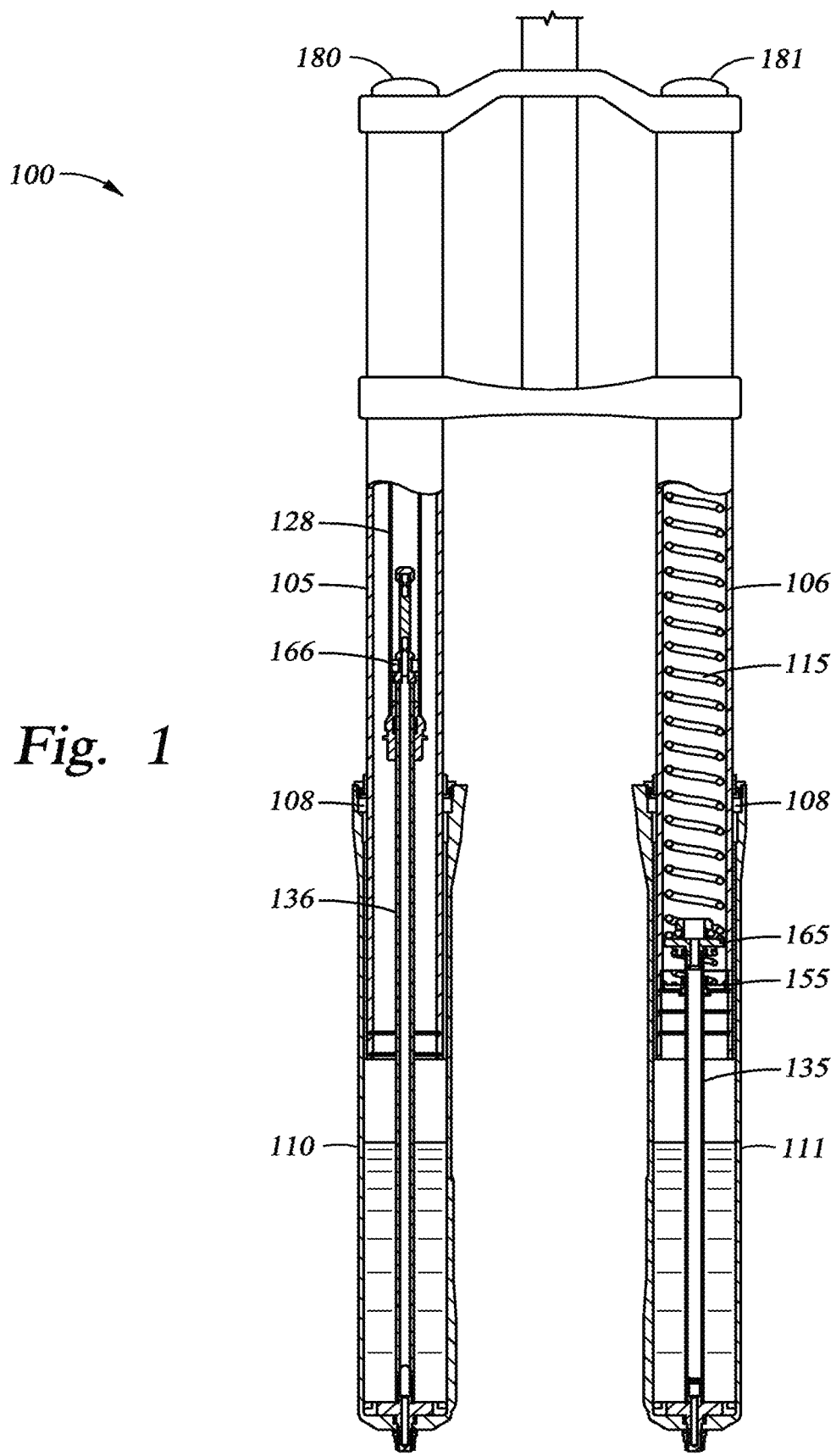
FIG. 1 shows an asymmetric bicycle fork having a damping leg and a spring leg, according to one example embodiment.

FIG. 1 shows an asymmetric bicycle fork 100 having a damping leg and a spring leg, according to one example embodiment. The damping leg includes an upper tube 105 mounted in telescopic engagement with a lower tube 110 and having fluid damping components therein. The spring leg includes an upper tube 106 mounted in telescopic engagement with a lower tube 111 and having spring components therein. The upper legs 105, 106 may be held centralized within the lower legs 110, 111 by an annular bushing 108. The fork 100 may be included as a component of a bicycle such as a mountain bicycle or an off-road vehicle such as an off-road motorcycle. In some embodiments, the fork 100 may be an "upside down" or Motocross-style motorcycle fork.

In one embodiment, the damping components inside the damping leg include an internal piston 166 disposed at an upper end of a damper shaft 136 and fixed relative thereto. The internal piston 166 is mounted in telescopic engagement with a cartridge tube 128 connected to a top cap 180 fixed at one end of the upper tube 105. The interior volume of the damping leg may be filled with a damping liquid such as hydraulic oil. The piston 166 may include shim stacks (i.e., valve members) that allow a damping liquid to flow through vented paths in the piston 166 when the upper tube 105 is moved relative to the lower tube 110. A compression chamber is formed on one side of the piston 166 and a rebound chamber is formed on the other side of the piston 166. The pressure built up in either the compression chamber or the rebound chamber during a compression stroke or a rebound stroke provides a damping force that opposes the motion of the fork 100.

The spring components inside the spring leg include a helically wound spring 115 contained within the upper tube 106 and axially restrained between top cap 181 and a flange 165. The flange 165 is disposed at an upper end of the riser tube 135 and fixed thereto. The lower end of the riser tube 135 is connected to the lower tube 111 in the spring leg and fixed relative thereto. A valve plate 155 is positioned within the upper leg tube 106 and axially fixed thereto such that the plate 155 moves with the upper tube 106. The valve plate 155 is annular in configuration, surrounds an exterior surface of the riser tube 135, and is axially moveable in relation thereto. The valve plate 155 is sealed against an interior surface of the upper tube 106 and an exterior surface of the riser tube 135. A substantially incompressible lubricant (e.g., oil) may be contained within a portion of the lower tube 111 filling a portion of the volume within the lower tube 111 below the valve plate 155. The remainder of the volume in the lower tube 111 may be filled with gas at atmospheric pressure.

During compression of fork 100, the gas in the interior volume of the lower tube 111 is compressed between the valve plate 155 and the upper surface of the lubricant as the upper tube 106 telescopically extends into the lower tube 111. The helically wound spring 115 is compressed between the top cap 181 and the flange 165, fixed relative to the lower tube 111. The volume of the gas in the lower tube 111 decreases in a nonlinear fashion as the valve plate 155, fixed relative to the upper tube 106, moves into the lower tube 111. As the volume of the gas gets small, a rapid build-up in pressure occurs that opposes further travel of the fork 100. The high pressure gas greatly augments the spring force of spring 115 proximate to the "bottom-out" position where the fork 100 is fully compressed. The level of the incompressible lubricant may be set to a point in the lower tube 111 such that the distance between the valve plate 155 and the level of the oil is substantially equal to a maximum desired travel of the fork 100.

Figure 2A:
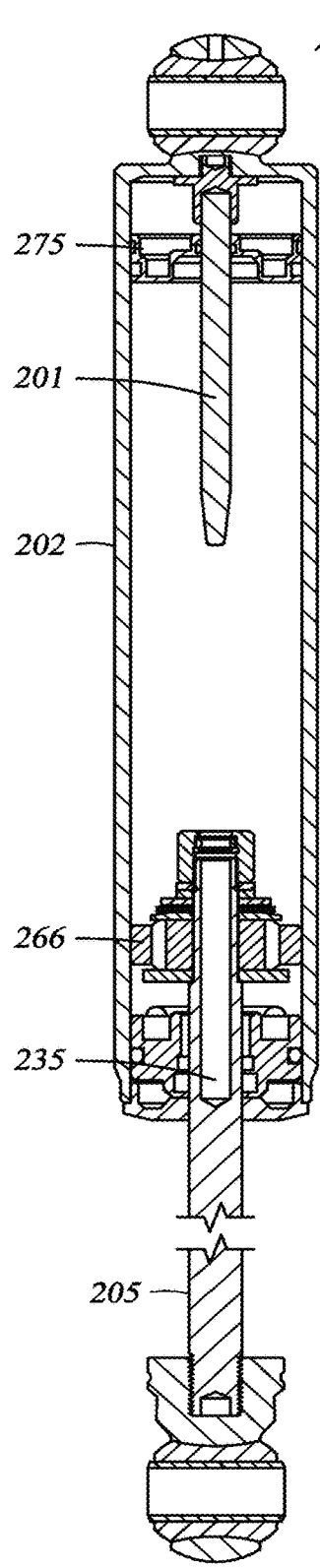
FIGS. 2A-2C show sectional side elevation views of a needle-type monotube damping unit in different stages of compression, according to one example embodiment.
Figure 2B:
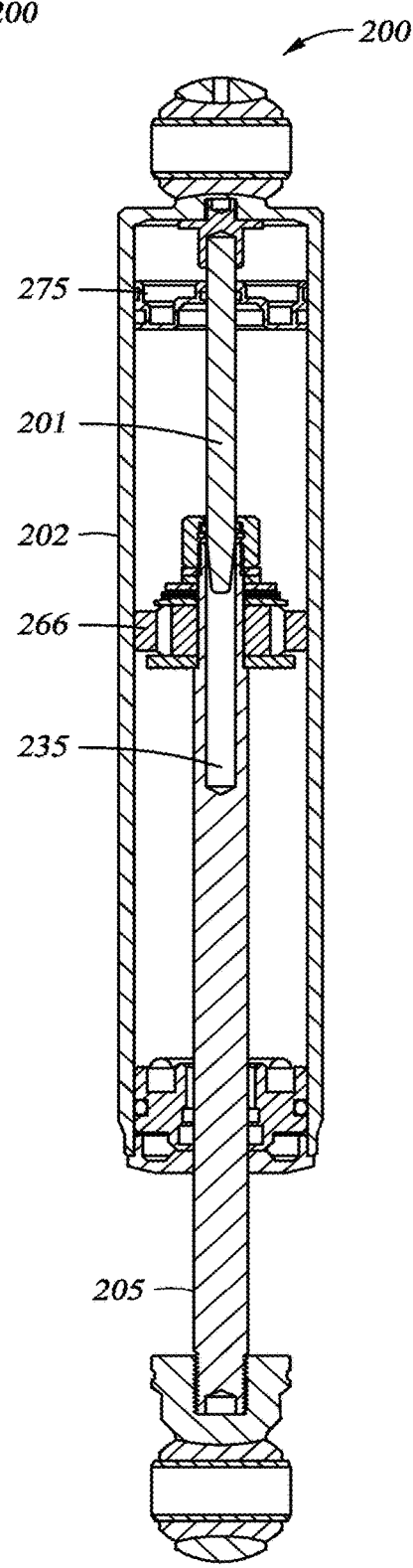
Figure 2C:
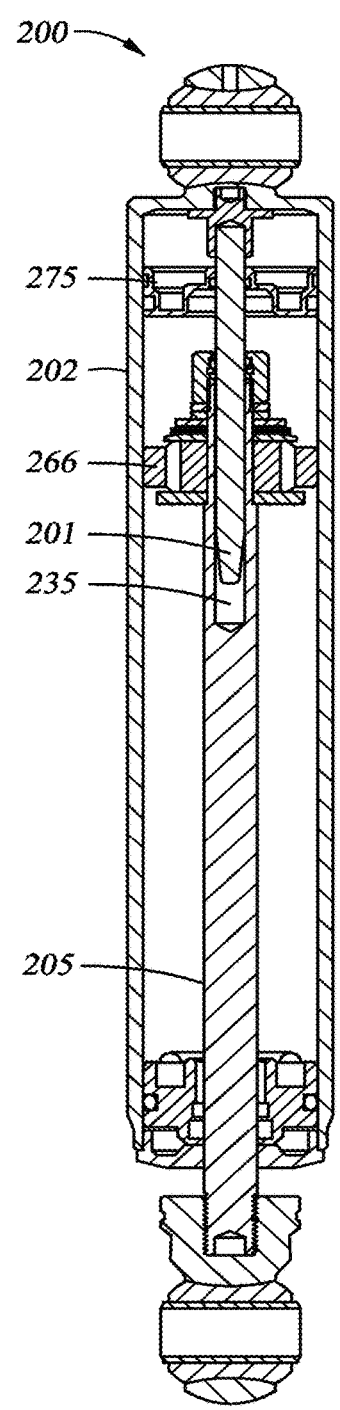

FIGS. 2A-2C show sectional side elevation views of a needle-type monotube damping unit 200 in different stages of compression, according to one example embodiment. In one embodiment, the components included in damping unit 200 may be implemented as one half of fork 100. In another embodiment, damping unit 200 may be implemented as a portion of a shock absorber that includes a helically-wound, mechanical spring mounted substantially coaxially with the damping unit 200. In yet other embodiments, damping unit 200 may be implemented as a component of a vehicle suspension system where a spring component is mounted substantially in parallel with the damping unit 200.

As shown in FIG. 2A, the damping unit 200 is positioned in a substantially fully extended position. The damping unit 200 includes a cylinder 202, a shaft 205, and a piston 266 fixed on one end of the shaft 205 and mounted telescopically within the cylinder 202. The outer diameter of piston 266 engages the inner diameter of cylinder 202. In one embodiment, the damping liquid (e.g., hydraulic oil or other viscous damping fluid) meters from one side to the other side of the piston 266 by passing through vented paths formed in the piston 266. Piston 266 may include shims (or shim stacks) to partially obstruct the vented paths in each direction (i.e., compression or rebound). By selecting shims having certain desired stiffness characteristics, the damping effects can be increased or decreased and damping rates can be different between the compression and rebound strokes of the piston 266. The damping unit 200 includes an annular floating piston 275 mounted substantially co-axially around a needle 201 and axially movable relative thereto. The needle 201 is fixed on one end of the cylinder 202 opposite the shaft 205. A volume of gas is formed between the floating piston 275 and the end of cylinder 202. The gas is compressed to compensate for motion of shaft 205 into the cylinder 202, which displaces a volume of damping liquid equal to the additional volume of the shaft 205 entering the cylinder 202.

During compression, shaft 205 moves into the cylinder 202, causing the damping liquid to flow from one side of the piston 266 to the other side of the piston 266 within cylinder 202. FIG. 2B shows the needle 201 and shaft 205 at an intermediate position as the damping unit 200 has just reached the "bottom-out" zone. In order to prevent the damping components from "bottoming out", potentially damaging said components, the damping force resisting further compression of the damping unit 200 is substantially increased within the "bottom-out" zone. The needle 201 (i.e., a valve member) compresses fluid in a bore 235, described in more detail below in conjunction with FIG. 3, thereby drastically increasing the damping force opposing further compression of the damping unit 200. Fluid passes out of the bore around the needle through a valve that is restricted significantly more than the vented paths through piston 266. As shown in FIG. 2C, the damping rate is increased substantially within the "bottom-out" zone until the damping unit 200 reaches a position where the damping unit 200 is substantially fully compressed.

Figure 3:
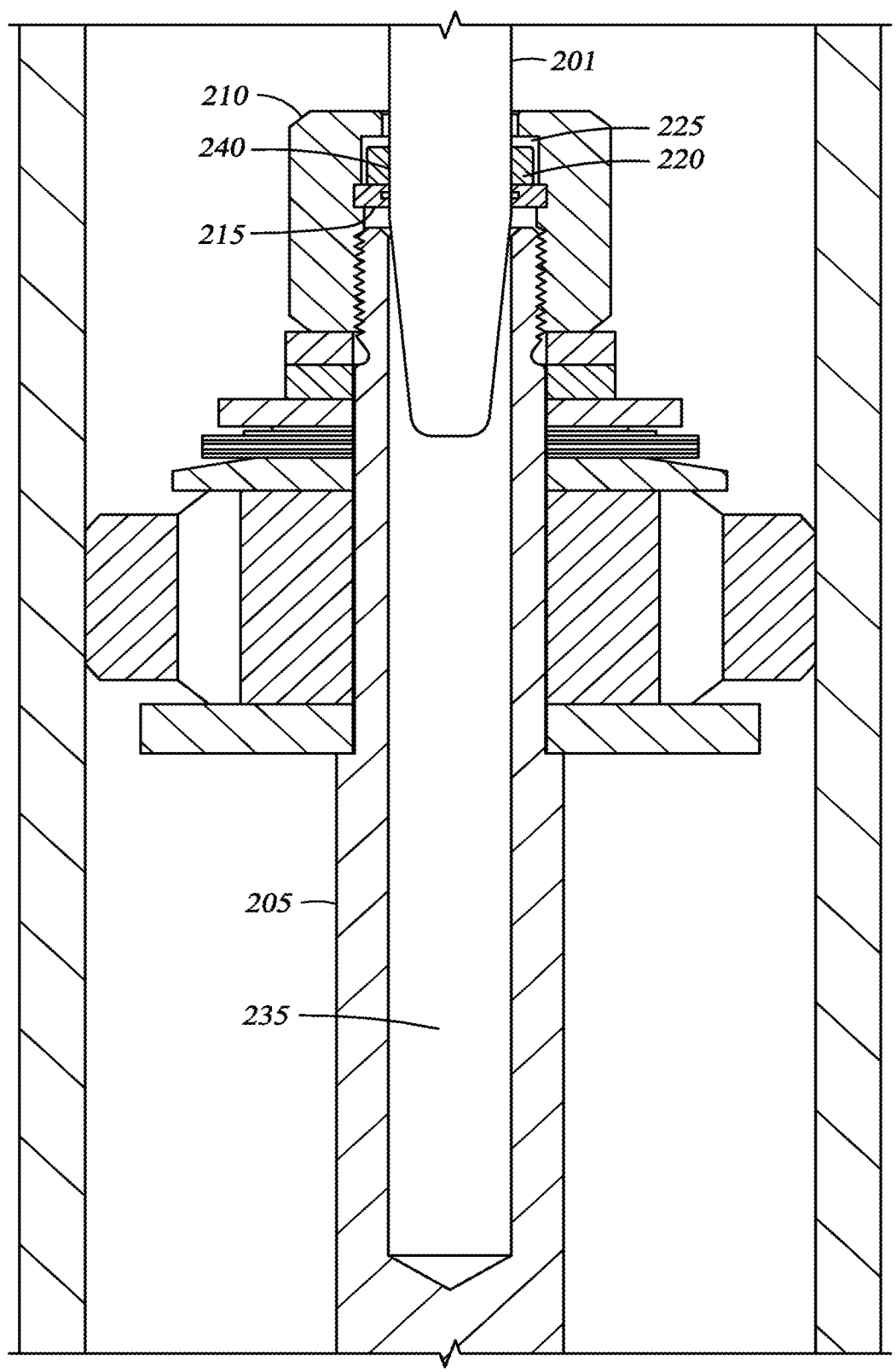
FIG. 3 shows a detailed view of the needle and bore at the intermediate position proximate to the "bottom-out" zone, according to one example embodiment.

FIG. 3 shows a detailed view of the needle 201 and bore 235 at the intermediate position proximate to the "bottom-out" zone, according to one example embodiment. As shown in FIG. 3, the needle 201 is surrounded by a check valve 220 contained within a nut 210 fixed on the end of shaft 205. During compression within the "bottom out" zone, the valve 220 is moved, by fluid pressure within the bore 235 and flow of fluid out of bore 235, upward against seat 225 of nut 210 and the bulk of escaping fluid must flow through the annular clearance 240 that dictates a rate at which the needle 201 may further progress into bore 235, thereby substantially increasing the damping rate of the damping unit 200 proximate to the "bottom-out" zone. The amount of annular clearance 240 between the exterior surface of the needle 201 and the interior surface of the valve 220 determines the additional damping rate within the "bottom-out" zone caused by the needle 201 entering the bore 235. In one embodiment, the needle 201 is tapered to allow easier entrance of the needle 201 into the bore 235 through valve 220.

During rebound within the "bottom out" zone, fluid pressure in the bore 235 drops as the needle 201 is retracted and fluid flows into the bore 235, causing the valve 220 to move toward a valve retainer clip 215 that secures the valve 220 within the nut 210. In one embodiment, the valve is castellated or slotted on the face of the valve 220 adjacent to the retainer clip 215 to prevent sealing the valve against the retainer clip 215, thereby forcing all fluid to flow back into the bore 235 via the annular clearance 240. Instead, the castellation or slot allows ample fluid flow into the bore 235 during the rebound stroke to avoid increasing the damping rate during rebound within the "bottom-out" zone. The valve 220 is radially retained within the nut 210, which has a recess having a radial clearance between the interior surface of the recess and the exterior surface of the valve 220 that allows for eccentricity of the needle 201 relative to the shaft 205 without causing interference that could deform the components of damping unit 200.

Figure 4A:
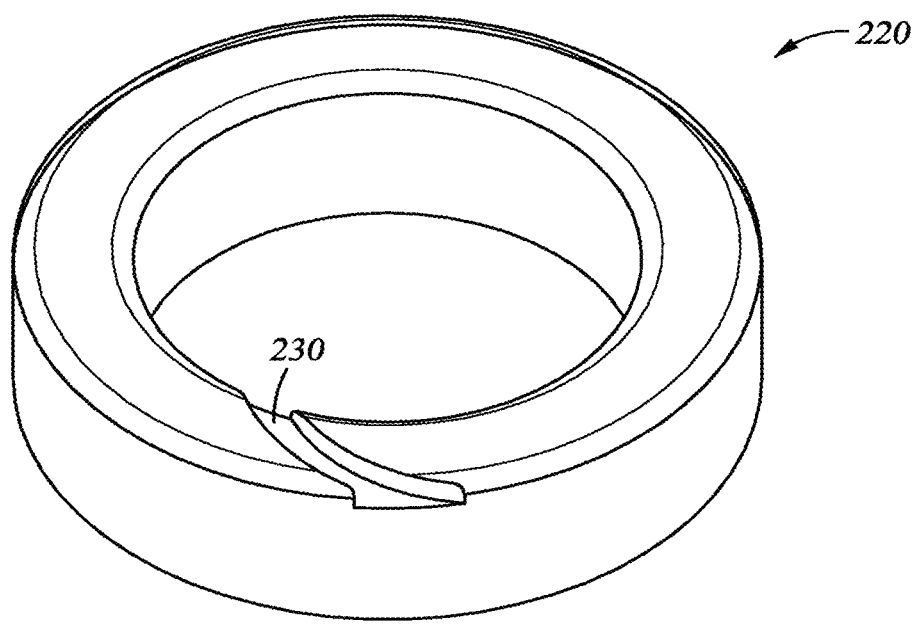
FIGS. 4A and 4B illustrate the castellated or slotted valve, according to one example embodiment.
Figure 4B:
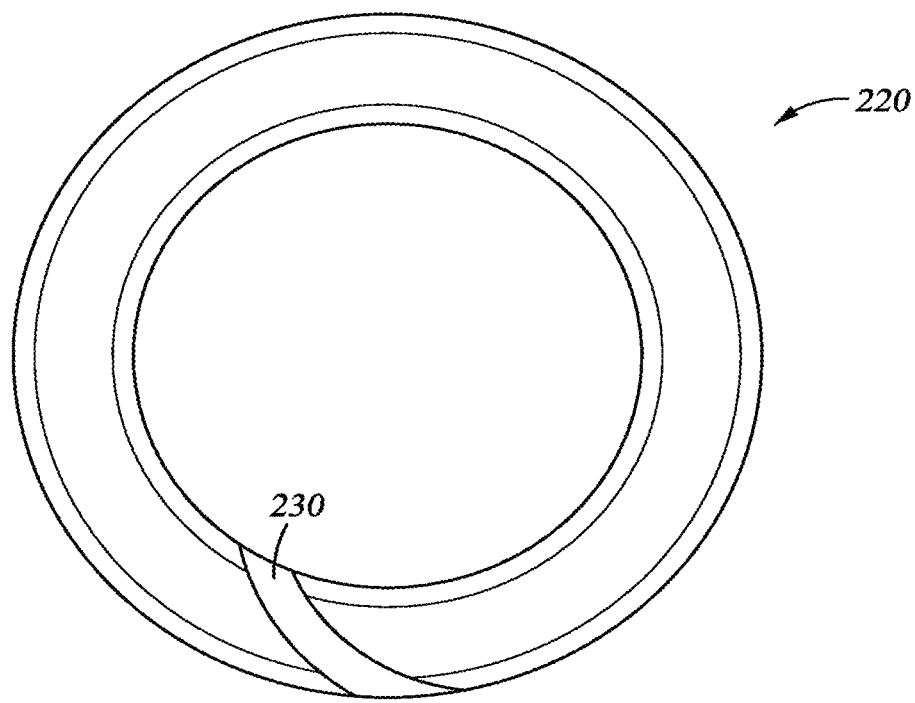

FIGS. 4A and 4B illustrate the castellated or slotted valve 220, according to one example embodiment. As shown in FIGS. 4A and 4B, the valve 220 is a washer or bushing having an interior diameter sized to have an annular clearance 240 between the interior surface of the valve 220 and the exterior surface of the needle 201 when the needle 201 passes through the valve 220. Different clearances 240 may be achieved by adjusting the interior diameter of the valve 220 in comparison to the diameter of the needle 201, which causes a corresponding change in the damping rate proximate to the "bottom-out" zone. A spiral face groove is machined into one side of the valve 220 to create the castellation or slot 230. It will be appreciated that the geometry of the slot 230 may be different in alternative embodiments and is not limited to the spiral design illustrated in FIGS. 4A and 4B. For example, the slot 230 may be straight (i.e., rectangular) instead of spiral, or the edges of the slot 230 may not be perpendicular to the face of the valve 220. In other words, the geometry of the slot 230 creates empty space between the surface of the retainer clip 215 and the surface of the valve 220 such that fluid may flow between the two surfaces.

When assembled, the valve 200 is oriented such that the side with the slot 230 is proximate to the upper face of the valve retainer clip 215, thereby preventing the surface of the valve 220 from creating a seal against the retainer clip 215. The slot 230 is configured to allow fluid to flow from cylinder 202 to bore 235 around the exterior surface of the valve 220, which has a larger clearance than the annular clearance 240 between the valve 220 and the needle 201. In one embodiment, two or more slots 230 may be machined in the face of the valve 220. In some embodiments, the valve 220 is constructed from high-strength yellow brass (i.e., a manganese bronze alloy) that has good characteristics enabling low friction between the valve 220 and the needle 201. In alternate embodiments, the valve 220 may be constructed from other materials having suitable characteristics of strength or coefficients of friction.

Figure 5A:
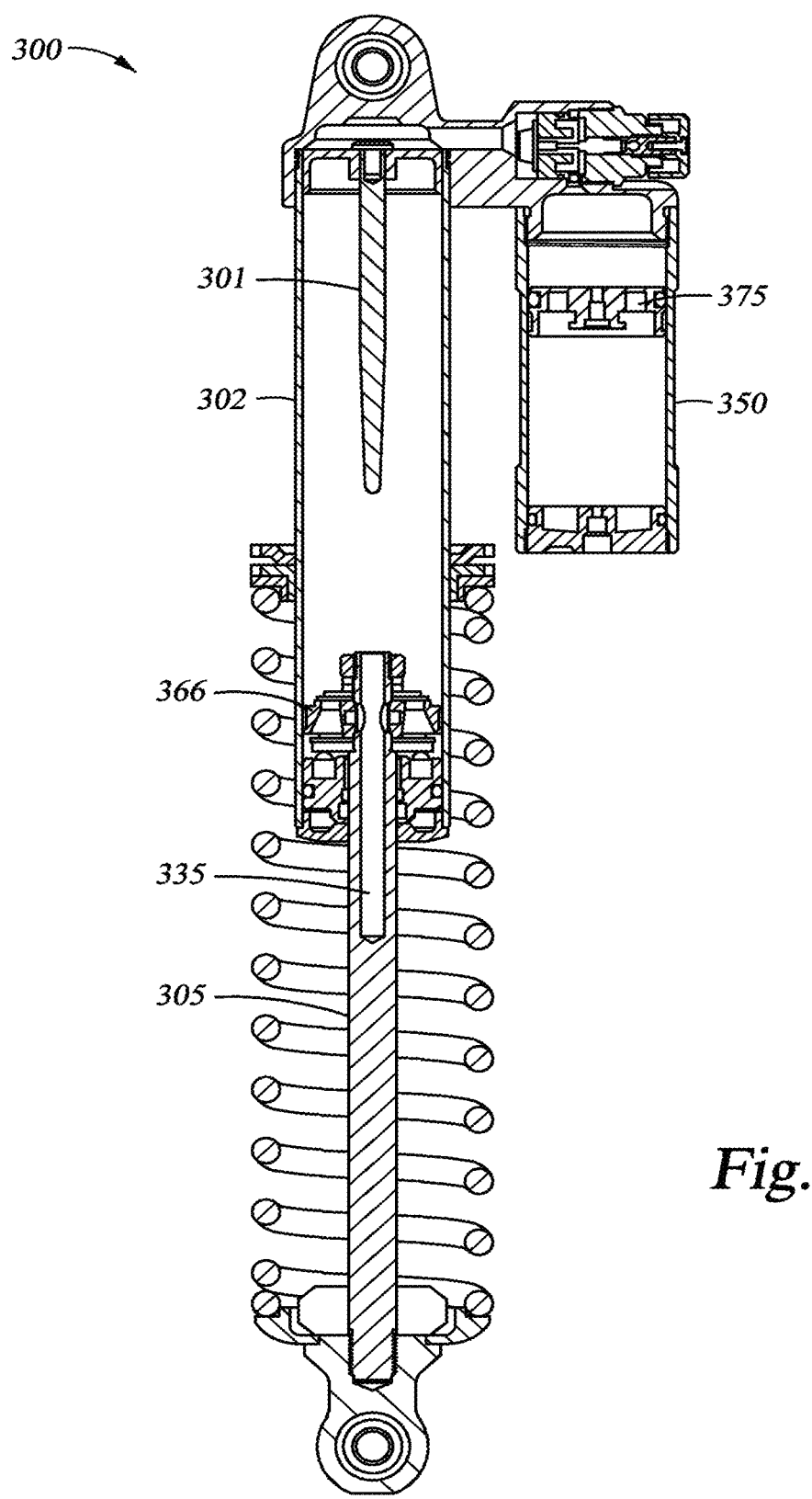
FIGS. 5A and 5B illustrate a damping unit having a "piggy back" reservoir, according to one example embodiment.
Figure 5B:
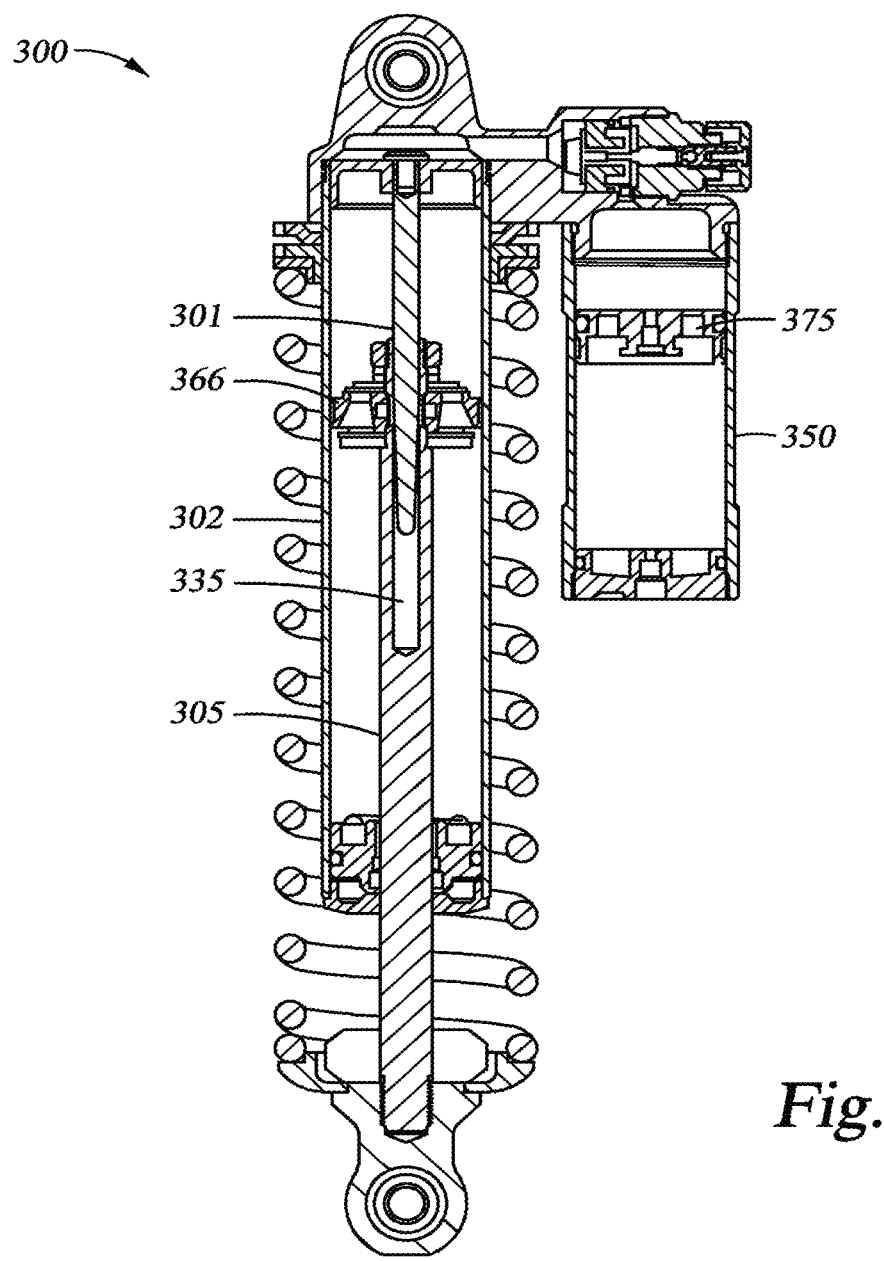

FIGS. 5A and 5B illustrate a damping unit 300 having a "piggy back" reservoir 350, according to another example embodiment. As shown in FIG. 5A, damping unit 300, shown fully extended, includes a cylinder 302 with a shaft 305 and a piston 366 fixed on one end of the shaft 305 and mounted telescopically within the cylinder 302. Damping unit 300 also includes a needle 301 configured to enter a bore 335 in shaft 305. However, unlike damping unit 200, damping unit 300 does not include an annular floating piston mounted substantially co-axially around the needle 301 and axially movable relative thereto. Instead, the piggy back reservoir 350 includes a floating piston 375 configured to perform a similar function to that of floating piston 275. A volume of gas is formed between the floating piston 375 and one end of the piggy back reservoir 350. The gas is compressed to compensate for motion of shaft 305 into the cylinder 302. Excess damping liquid may enter or exit cylinder 302 from the piggy back reservoir 350 as the volume of fluid changes due to ingress or egress of shaft 305 from the cylinder 302. In FIG. 5B, the damping unit 300 is shown proximate to the "bottom out" zone where needle 301 has entered bore 335.

Figure 6:
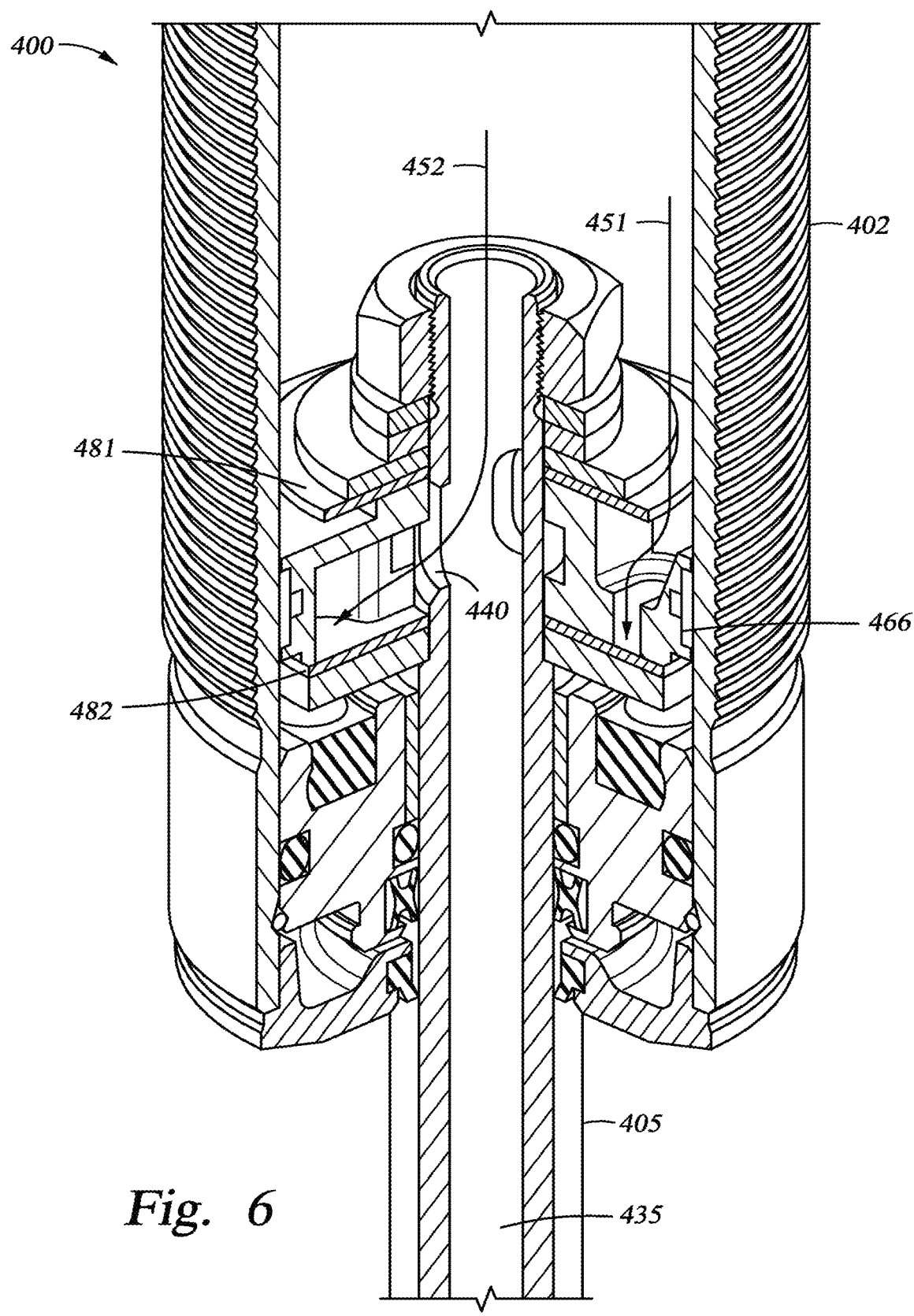
FIG. 6 illustrates a half section, orthographic view of a damping unit, according to another example embodiment.

FIG. 6 illustrates a half section, orthographic view of a damping unit 400, according to another example embodiment. As shown in FIG. 6, damping unit 400 includes a piston 466 fixed on one end of a shaft 405 and mounted telescopically within a cylinder 402. The shaft 405 includes a bore 435 that enables ingress of a needle (e.g., 201, 301) to change the damping characteristics of the damping unit 400 proximate to the "bottom out" zone. The piston assembly includes a top shim stack 481 and a bottom shim stack 482 attached to the top face and bottom face of the piston 466, respectively, which enable different damping resistances to be set during the compression stroke and the rebound stroke. During operation, where a needle has not entered bore 435, the damping liquid flows from one side of the piston 466 to the other side through multiple flow paths 451, 452, and 453. In compression, a first flow path 451 (i.e., a damping flow path) allows the damping liquid to flow from an upper portion of the cylinder 402 through vented paths in the piston 466 and into a lower portion of the cylinder 402, forcing the bottom shim stack 482 away from the bottom face of the piston 466. A second flow path 452 (i.e., a bypass flow path) allows the damping liquid to flow from an upper portion of the cylinder 402 through the bore 435 and shaft ports 440 in shaft 405 and into additional vented paths in the piston 466 through the bottom shim stack 482 and into the lower portion of the cylinder 402. In rebound, a third flow path 453 (i.e., a rebound flow path, not shown in FIG. 6) allows the damping liquid to flow from a lower portion of the cylinder 402, through different vented paths in the piston 466, through the top shim stack 481, and into an upper portion of the cylinder 402. In some embodiments, the first flow path 451 and the second flow path 452 may be associated with separate and distinct shim stacks. For example, the bottom shim stack 482 may be replaced by two shim stacks configured in a clover pattern and arranged such that a first shim stack covers the vented paths in the piston 466 corresponding to the first flow path 451 and a second shim stack covers the additional vented paths in the piston 466 corresponding to the second flow path 452.

When a needle just enters bore 435, the needle impedes the damping liquid in the upper portion of the cylinder 402 from flowing through the second flow path 452 due to the "plugging" effect of the needle blocking the entrance to the bore 435. However, the damping liquid may continue to pass through the piston 466 through the first flow path 451. In addition, some damping liquid may continue to flow out of ports 440 from bore 435 as the needle continues ingress into bore 435 and decreases the fluid volume inside the bore 435. It will be appreciated that the damping rate will increase as the needle blocks the second flow path 452, thereby forcing substantially all damping liquid in the upper portion of the cylinder 402 to move through piston 466 via the first flow path 451. At some point during ingress of the needle, the full diameter of the needle is adjacent to the shaft ports 440, substantially blocking additional damping liquid from leaving bore 435 through the shaft ports 440. Again, the damping rate will increase as the needle blocks the shaft ports 440 and fluid pressure rapidly builds up within bore 435 and acts on the needle to oppose any further compression of the damping unit 400.

Figure 7A:
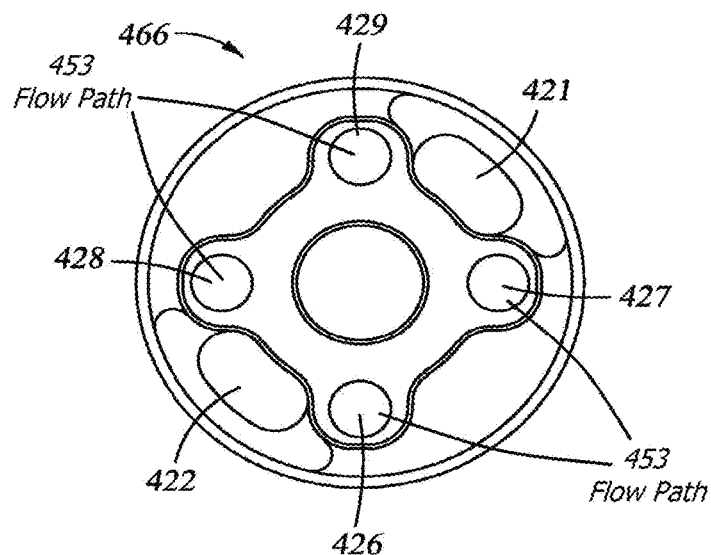
FIGS. 7A through 7E illustrate the piston of FIG. 6, according to one example embodiment.
Figure 7B:
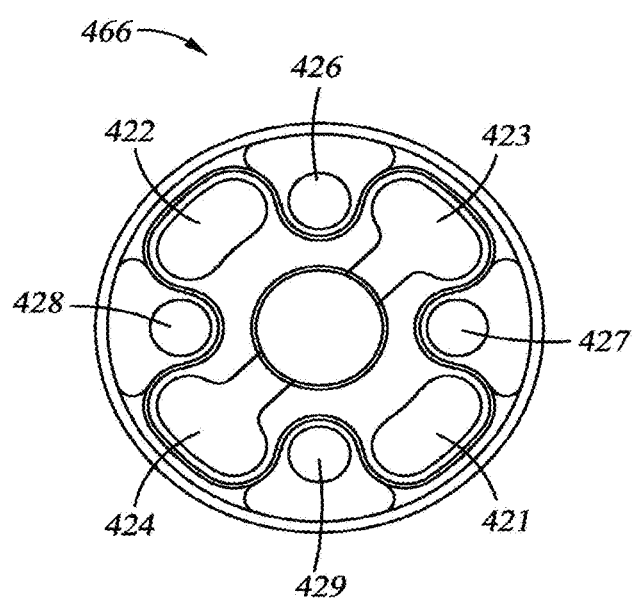
Figure 7C:
Figure 7D:
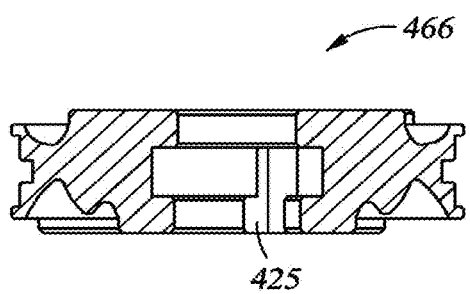
Figure 7E:
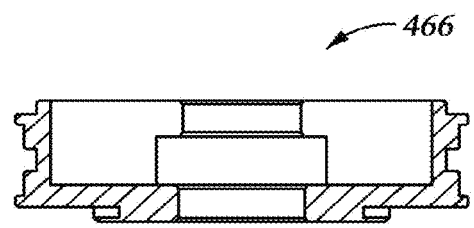

FIGS. 7A through 7E illustrate the piston 466 of FIG. 6, according to one example embodiment. As shown in FIGS. 7A and 7B, the piston 466 includes two vented paths (i.e., 421, 422) that allow damping liquid to flow from the upper portion of the cylinder 402 to the lower portion of the cylinder 402 via the first flow path 451 (i.e., bypassing the top shim stack and entering the piston 466 proximate to the inner surface of cylinder 402). The piston 466 also includes two additional vented paths (i.e., 423, 424) that allow damping liquid to flow from the upper portion of the cylinder 402 to the lower portion of the cylinder 402 via the second flow path 452 (i.e., through the bore 435 and shaft ports 440). The additional vented paths are connected to the bore 435 via channels 425 that fluidly couple the additional vented paths to the shaft ports 440 in shaft 405 through a surface on the inner diameter of the piston 466. The four vented paths described above (i.e., 421-424) allow damping liquid to flow from an upper portion of the cylinder 402 to a lower portion of the cylinder 402 during a compression stroke. In rebound, yet another set of four vented paths (i.e., 426, 427, 428, 429) allow damping liquid to flow from the lower portion of the cylinder 402 to the upper portion of the cylinder 402 via the third flow path 453 (i.e., bypassing the bottom shim stack 482 and passing into the upper portion of the cylinder 402 through the top shim stack 481). FIG. 7C shows a side view of the piston 466 of FIGS. 7A and 7B. FIG. 7D shows a cross section of the piston 466 showing the inner diameter that is fit over shaft 405 as well as one channel 425 connected to one of the additional vented paths in the piston corresponding to the first second flow path 452. FIG. 7E shows a cross section of the piston 466 showing vented paths 423 and 424.

FIGS. 8A and 8B illustrate the shaft 405 of FIG. 6, according to one example embodiment. As shown in FIGS. 8A and 8B, the shaft 405 includes a bore 435 formed (e.g., drilled, milled, etc.) into a top portion of the shaft. In one embodiment, the top portion of the shaft may have a smaller diameter than the body of the shaft 405, forming a seat a particular distance from one end of the shaft 405. The piston assembly including the piston 466 and the shim stacks may be mounted over the top portion of the shaft 405 and secured with a nut threaded onto the end of the shaft 405. In alternative embodiments, the nut may be press fit onto the shaft 405 or secured in any other technically feasible manner.

Shaft ports 440 may be formed through an outer face of the top portion of the shaft 405 proximate a surface on the inner diameter of the piston 466 when mounted on the shaft 405. The shaft ports 440 fluidly couple the bore 435 in the shaft 405 with the additional vented paths (i.e., 423, 424) in the piston 466 such that fluid may flow through the bore 435 via the second flow path 452. In other words, the second flow path 452 enables additional fluid to flow through the bottom shim stacks 482 when a needle is not blocking the bore 435.

It should be noted that any of the features disclosed herein may be used alone or in combination. While the foregoing is directed to embodiments of the present disclosure, other and further embodiments may be implemented without departing from the scope of the disclosure, the scope thereof being determined by the claims that follow.

What we claim is:

1. A vehicle suspension damper comprising:
    a cylinder containing damping fluid and a piston assembly comprising:
        a piston;
        a piston rod;
        a first fluid path through said piston assembly and a second fluid path through said piston assembly, said first fluid path and said second fluid path for permitting damping fluid to pass from a first side of said piston to a second side of said piston during a compression stroke of said vehicle suspension damper;
        a valve member for resisting fluid flow through said second fluid path, wherein said valve member is moved into a bore during compression and out of said bore during extension, so as to displace at least some of said damping fluid through said first fluid path and said second fluid path, and wherein said valve member comprises a needle member sized to be inserted into said bore and withdrawn from said bore, whereby a restriction to fluid flow through said second fluid path is generated, said restriction being independent of pressure of said damping fluid caused by compression of said vehicle suspension damper, said bore comprises a blind bore and, in use as said valve member is moved into said bore during compression said valve member firstly begins to block said second fluid path, thereby forcing said damping fluid to flow through said piston via said first fluid path, and secondly said valve member blocks said second fluid path, thereby blocking additional damping fluid from leaving said bore via said second fluid path such that fluid pressure builds up within said bore to oppose any further compression of said damper;
a floating piston surrounding said needle member; and
a slotted, ring-shaped check valve fluidically coupled to said piston.

2. The vehicle suspension damper of claim 1, wherein in use said restriction provided by said valve member is dependent on a position of said suspension damper in said compression stroke.

3. The vehicle suspension damper of claim 1 wherein said valve member is configured to enter said bore toward a maximum compression of said suspension damper.

4. The vehicle suspension damper of claim 1 wherein said suspension damper is coupled to a vehicle.

* * * * *